(12) United States Patent
Yamaguchi et al.

(10) Patent No.: US 9,863,351 B2
(45) Date of Patent: Jan. 9, 2018

(54) ENGINE CONTROL DEVICE AND METHOD FOR ESTIMATING BRAKE PEDAL DEPRESSING FORCE

(71) Applicant: MAZDA MOTOR CORPORATION, Hiroshima (JP)

(72) Inventors: Toshiyuki Yamaguchi, Hiroshima (JP); Toshiyuki Matsuzaki, Hiroshima (JP); Jun Katayose, Hiroshima (JP); Kouji Nagaoka, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/432,205

(22) Filed: Feb. 14, 2017

(65) Prior Publication Data

US 2017/0254284 A1  Sep. 7, 2017

(30) Foreign Application Priority Data

Mar. 3, 2016 (JP) .................................. 2016-041198

(51) Int. Cl.
*B60W 10/04* (2006.01)
*F02D 41/10* (2006.01)
*B60T 13/14* (2006.01)

(52) U.S. Cl.
CPC .......... *F02D 41/107* (2013.01); *B60T 13/145* (2013.01); *B60T 2260/09* (2013.01); *F02D 2200/602* (2013.01)

(58) Field of Classification Search
CPC ............. F02D 41/107; F02D 2200/602; B60T 13/145; B60T 2260/09
See application file for complete search history.

(56) References Cited

U.S. PATENT DOCUMENTS

| 2010/0117445 A1* | 5/2010 | Kato ....................... B60T 7/042 303/11 |
| 2010/0298095 A1* | 11/2010 | Wang ..................... B60K 6/485 477/183 |
| 2013/0029806 A1* | 1/2013 | Syed ..................... F02D 41/107 477/183 |

FOREIGN PATENT DOCUMENTS

JP  2005-291030 A  10/2005

* cited by examiner

*Primary Examiner* — David J Hlavka
(74) *Attorney, Agent, or Firm* — Studebaker & Brackett PC

(57) ABSTRACT

A PCM (50) that is an engine control device functions to acquire a master vac negative pressure which is the negative pressure of a stabilized chamber of a master vac (126) which amplifies a brake pedal depressing force applied to a brake pedal (102), and also acquire a brake working fluid pressure that is a braking hydraulic pressure produced by a master cylinder (144) in accordance with the brake pedal depressing force amplified by the master vac (126), and in a case where both accelerator pedal (104) and a brake pedal (102) are depressed or actuated simultaneously, determine whether or not it is necessary to decrease engine output based on such master vac negative pressure and brake working fluid pressure to execute the output decreasing control for decreasing the engine output.

9 Claims, 12 Drawing Sheets

FIG.7

| Pattern | Accelerator position change gain | |
|---|---|---|
| | Lowering side | Raising side |
| Pattern A | Large | — |
| Pattern B | Small | — |
| Pattern C | — | Medium |
| Pattern D | — | Small |
| Pattern E | — | Large |
| Pattern F | — | Small |

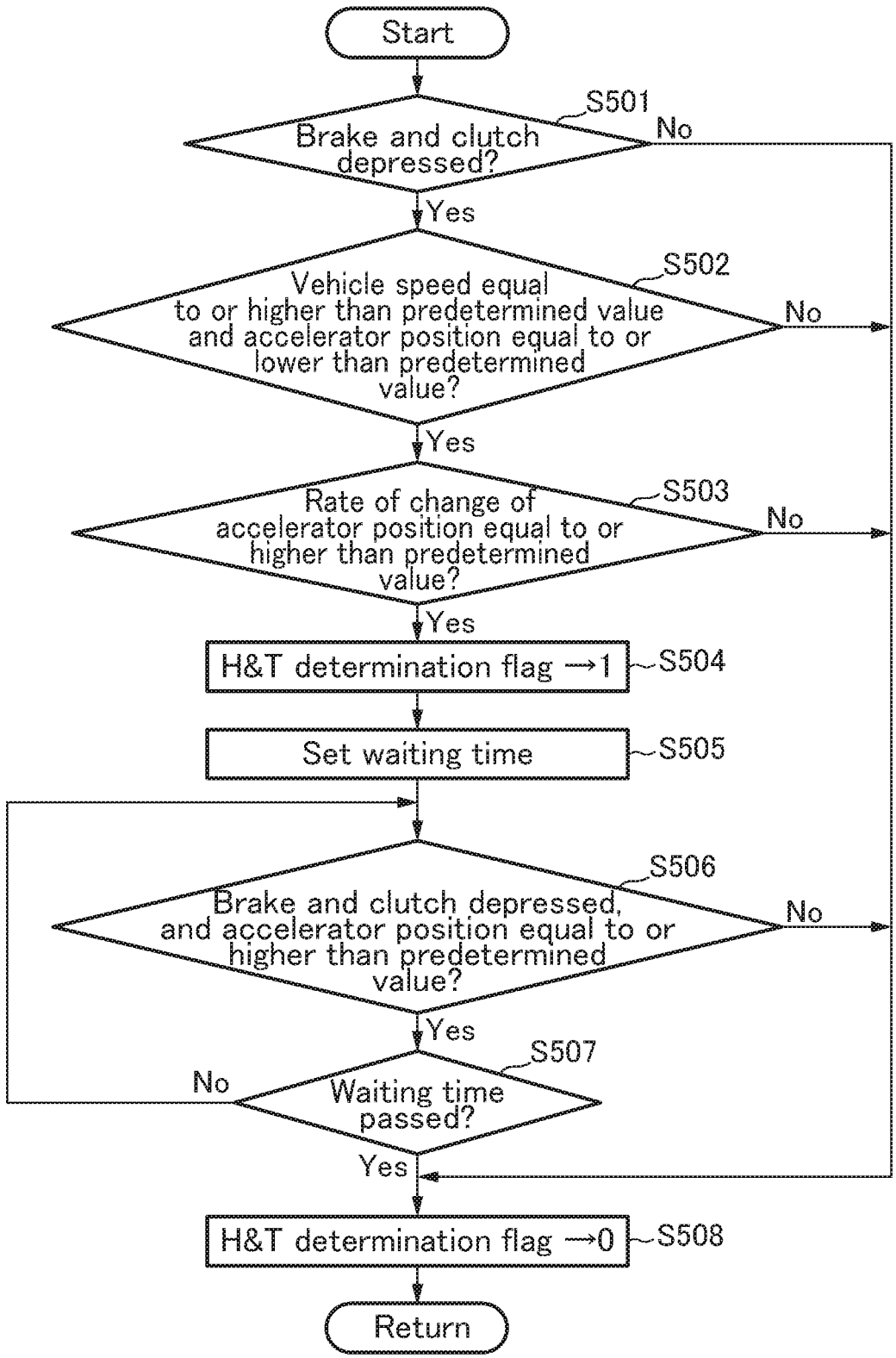

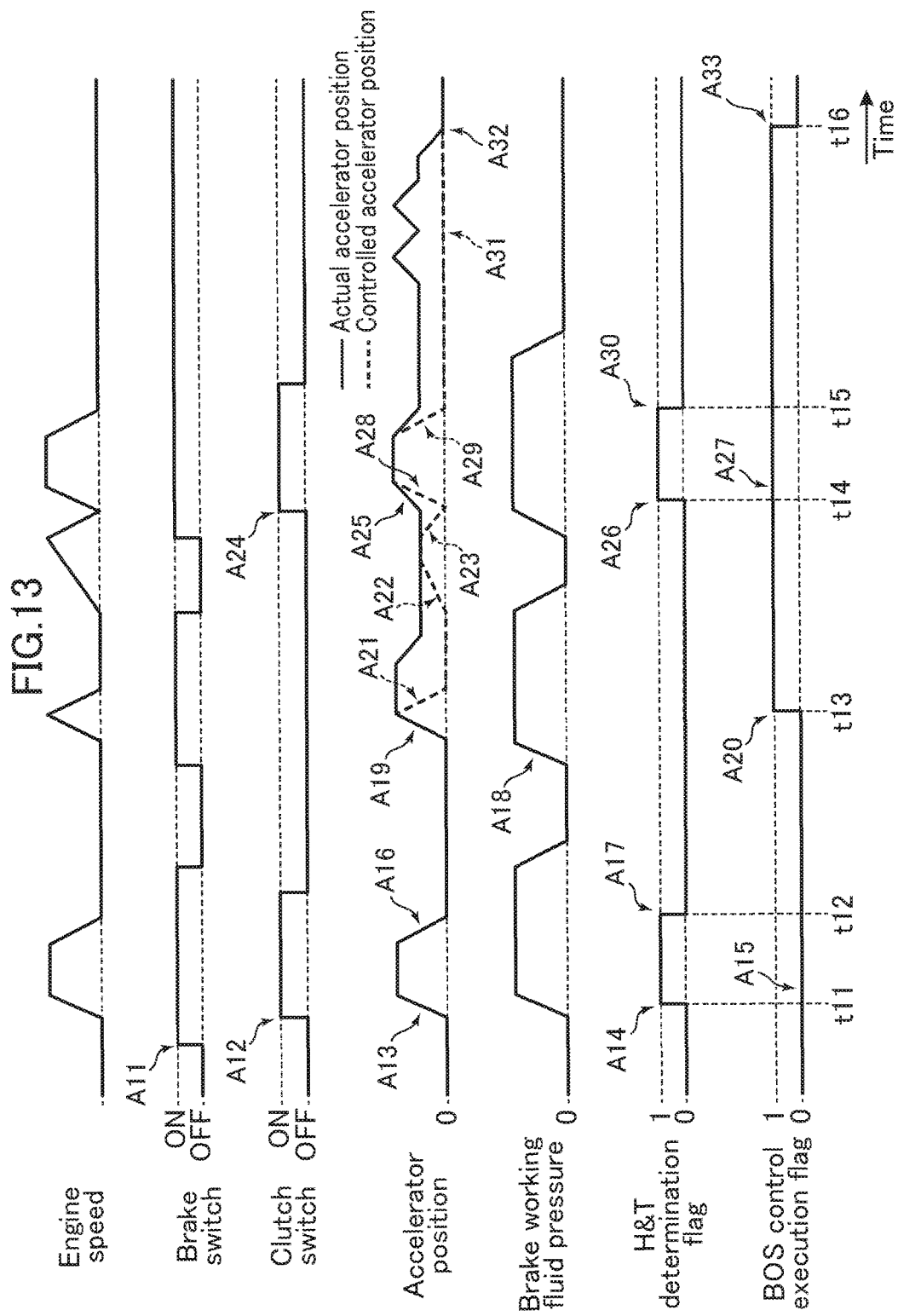

ENGINE CONTROL DEVICE AND METHOD FOR ESTIMATING BRAKE PEDAL DEPRESSING FORCE

BACKGROUND OF THE INVENTION

Field of the Invention

The present invention relates to an engine control device and a method for estimating a brake pedal depressing force, and more particularly to an engine control device configured to control an engine based on operation of an accelerator pedal and a brake pedal, and a method for estimating a brake pedal depressing force applied to the brake pedal.

Description of Related Art

Conventionally, in order to prevent runaway or the like of a vehicle caused by an accelerator pedal and a brake pedal being depressed or actuated simultaneously by a driver's mistake, there has been known to provide a control for forcibly decreasing engine output in a case where the accelerator pedal and the brake pedal are depressed or actuated simultaneously. For example, Patent Document 1 (Japanese Laid-Open Patent Publication 2005-291030A) discloses a technique for controlling the engine to be put into an idle state forcibly, regardless of an engine signal based on a depressed or actuated amount of the accelerator pedal, in a case where a depressed or actuated amount of the brake pedal or a brake operating pressure is of a value equal to or higher than a predetermined value which is a value corresponding to the depressed or actuated amounts of the accelerator pedal and the brake pedal which has been produced as the results of the driver's intentional simultaneous actuation.

BRIEF SUMMARY OF THE INVENTION

Technical Problem

Generally, use has been made a brake system which is configured to amplify a brake pedal depressing force (operating force) applied to a brake pedal by a driver. Specifically, the brake system comprises a brake pedal, a master vac (in other words, a vacuum-operated brake booster) for amplifying the brake pedal depressing force applied to the brake pedal by the driver with the aid of a negative pressure, a master cylinder connected to the brake pedal and the master vac for converting the force (in other words, the amplified brake pedal depressing force) applied from the brake pedal and the master vac into a hydraulic pressure for output, and a wheel cylinder for actuating the brake by the hydraulic pressure supplied from the master cylinder (it is a braking hydraulic pressure for applying a braking effort to a vehicle, and hereinafter referred as "brake working fluid pressure"). More specifically, the master vac comprises a stabilized chamber having an internal pressure kept negative, and a variable pressure chamber having an internal pressure which changes in accordance with the operation of the brake pedal, the brake pedal depressing force being amplified in accordance with a difference between the internal pressure of the stabilized chamber and that of the variable pressure chamber.

In such brake system, a master vac negative pressure which is the negative pressure of the stabilized chamber of the master vac is controlled to change in accordance with for example the atmospheric pressure or the like. With this control, even when the driver has applied a same amount of brake pedal depressing force, the brake working fluid pressure changes in accordance with the master vac negative pressure. For example, when the master vac negative pressure is of a high value, the brake working fluid pressure becomes relatively higher even if the brake pedal depressing force applied by the driver is small.

Meanwhile, the control system described in the above Patent Document 1 is configured such that, in a case where both the accelerator pedal and the brake pedal are depressed or actuated simultaneously, the control for decreasing the engine output is executed when the brake working pressure corresponding to the brake working fluid pressure is of a value equal to or higher than the predetermined value. In a case where the aforementioned control system is applied to the above brake system, under a situation where the master vac negative pressure is of a high value, the brake working fluid pressure will show a higher value even if the brake pedal depressing force applied by the driver is small, so that the control for decreasing the engine output is likely to be executed. Under such a case, the vehicle is decelerated even if the driver has little intention of applying a braking effort, so that an unintended decelerating feeling may be provided to the driver. Therefore, it may be desirable to appropriately grasp the brake pedal depressing force applied by the driver to determine necessity of executing the control for decreasing the engine output in a case where both the accelerator pedal and the brake pedal are depressed or actuated simultaneously.

Further, in the followings, the control for forcibly decreasing the engine output in a case where both the accelerator pedal and the brake pedal are depressed or actuated simultaneously (output decreasing control) is appropriately referred as "BOS control". The "BOS" stands for "Brake Override System".

The present invention has been made to solve the above conventional problem, and an object thereof is to provide an engine control device which can appropriately determine necessity of executing an output decreasing control for decreasing engine output in consideration of the driver's intention of applying a braking effort when an accelerator pedal and a brake pedal are depressed or actuated simultaneously, and to provide a method for estimating a brake pedal depressing force which can appropriately estimate a brake pedal depressing force based on a master vac negative pressure and a brake working fluid pressure.

Solution to Problem

In order to achieve the above object, in the present invention, there is provided an engine control device configured to control an engine based on operation of an accelerator pedal and a brake pedal, including: a master vac negative pressure acquiring unit configured to acquire a master vac negative pressure in a master vac, wherein the master vac includes a stabilized chamber having an internal pressure kept negative, and a variable pressure chamber having an internal pressure which changes in accordance with an actuation of the brake pedal, wherein the master vac amplifies a brake pedal depressing force applied to the brake pedal in accordance with a difference between the internal pressure of the stabilized chamber and the internal pressure of the variable pressure chamber, and wherein the master vac negative pressure is a negative pressure of the stabilized chamber of the master vac; a brake working fluid pressure acquiring unit configured to acquire a brake working fluid pressure as a braking hydraulic pressure generated by a master cylinder in accordance with the brake pedal depressing force amplified by the master vac; a necessity determining unit configured to determine whether or not it is necessary to decrease engine output based on the master vac negative pressure acquired by the master vac negative pressure acquiring unit and the brake working fluid pressure acquired by the brake working fluid pressure acquiring unit, when both the accelerator pedal and the brake pedal are depressed simultaneously; and an engine controlling unit configured to perform an output decreasing control to decrease the engine output when the necessity determining unit determines that it is necessary to decrease the engine output.

According to the present invention having the above features, in a case where both of the accelerator pedal and the brake pedal are depressed or actuated simultaneously, the necessity of executing a control for decreasing the engine output is determined based not only on the brake working fluid pressure but also on both of the master vac negative pressure and the brake working fluid pressure in a brake system. With this operation, it is possible to determine the necessity of executing the control for decreasing the engine output based on the driver's application of brake corresponding to the characteristics of the master vac negative pressure and the brake working fluid pressure. Thus, according to the present embodiments, it is possible to appropriately determine the necessity of executing the output decreasing control considering the driver's intention of applying a braking effort. Therefore, according to the present embodiments, when both the accelerator pedal and the brake pedal are depressed or actuated simultaneously, it is possible to appropriately satisfy both safety and drivability.

In the present invention, preferably, the necessity determining unit is configured to determine the brake pedal depressing force based on the master vac negative pressure and the brake working fluid pressure, and to determine that it is necessary to decrease the engine output when the determined brake pedal depressing force is equal to or larger than a predetermined threshold value.

According to the present invention having the above features, since the brake pedal depressing force applied to the brake pedal by the driver is determined based on the master vac negative pressure and the brake working fluid pressure, and the necessity of executing the output decreasing control is determined based on such brake pedal depressing force, it is possible to take into account the driver's intention of applying a braking effort more effectively.

In the present invention, preferably, the necessity determining unit is configured to determine the brake pedal depressing force having a larger value as the master vac negative pressure becomes smaller under the same brake working fluid pressure.

According to the present invention having the above features, it is possible to accurately determine the brake pedal depressing force corresponding to the master vac negative pressure and the brake working fluid pressure.

In the present invention, preferably, the necessity determining unit is configured, when the master vac negative pressure is equal to or smaller than a predetermined value, to use a fixed value as the brake pedal depressing force to determine whether or not it is necessary to decrease the engine output.

When the master vac negative pressure is of a value equal to or lower than the predetermined value, in other words, when the pressure of the master vac is of a high value, there is a possibility that the brake pedal depressing force cannot be determined appropriately based on the relationship between the master vac negative pressure and the brake working fluid pressure, but according to the present invention having the above features, it is possible as well in this case to appropriately determine the necessity of executing the output decreasing control using the brake pedal depressing force since a fixed value is applied as the brake pedal depressing force when the master vac negative pressure is of a value equal to or lower than the predetermined value.

In the present invention, preferably, the necessity determining unit is configured to determine the brake pedal depressing force corresponding to the master vac negative pressure acquired by the master vac negative pressure acquiring unit and the brake working fluid pressure acquired by the brake working fluid pressure acquiring unit, based on a predetermined characteristic showing a relationship between the master vac negative pressure, the brake working fluid pressure and the brake pedal depressing force.

According to the present invention having the above features, it is possible to easily determine the brake pedal depressing force corresponding to the current master vac negative pressure and the brake working fluid pressure by using the characteristic (such as a map) showing the relationship between the master vac negative pressure, the brake working fluid pressure and the brake pedal depressing force determined in advance.

In the present invention, preferably, the master vac negative pressure acquiring unit is configured to acquire the master vac negative pressure by a pressure sensor provided on the master vac.

According to the present invention having the above features, it is possible to acquire an accurate master vac negative pressure.

According to the present invention, preferably, the master vac negative pressure acquiring unit is configured to acquire a negative pressure which is estimated based on an atmospheric pressure, as the master vac negative pressure.

According to the present invention having the above features, it is possible to appropriately acquire the master vac negative pressure by estimating the master vac negative pressure from the atmospheric pressure in a case where an abnormal condition has occurred in a sensor for detecting the master vac negative pressure and/or in a case where a system which originally does not have the sensor for detecting the master vac negative pressure is applied.

In the present invention, preferably, the engine controlling unit is configured to: set a target torque based on an accelerator position being a position of the accelerator pedal to control an engine torque so that the target torque is realized; and decrease the target torque to decrease the engine output by decreasing the accelerator position applied for setting the target torque, when the output decreasing control is executed.

According to the present invention having the above features, since the engine torque is controlled based on the accelerator position, it is possible to improve controllability of the engine torque. More particularly, when the output decreasing control is executed, by decreasing the accelerator position applied for setting the target torque, it is possible to improve controllability of the output decreasing control.

In another aspect of the present invention, there is provided a brake pedal depressing force estimation method for estimating a brake pedal depressing force applied to a brake pedal, comprising steps of: acquiring a master vac negative pressure of a master vac, wherein the master vac includes a stabilized chamber having an internal pressure kept negative, and a variable pressure chamber having an internal pressure which changes in accordance with an actuation of the brake pedal, wherein the master vac amplifies a brake pedal depressing force in accordance with a difference between the internal pressure of the stabilized chamber and the internal pressure of the variable pressure chamber, and wherein the master vac negative pressure is a negative pressure of the stabilized chamber of the master vac; acquiring a brake working fluid pressure as a braking hydraulic pressure generated by a master cylinder in accordance with the brake pedal depressing force amplified by the master vac; and determining the brake pedal depressing force based on the acquired master vac negative pressure and brake working fluid pressure, wherein the brake pedal depressing force is determined to be a larger value as the master vac negative pressure becomes smaller under the same brake working fluid pressure.

According to the present invention having the above features, with respect to the brake system having the master vac and the master cylinder, it is possible to accurately determine the brake pedal depressing force corresponding to the characteristics of the master vac negative pressure and the brake working fluid pressure.

According to the engine control device of the present invention, it is possible to appropriately determine the necessity of executing the output decreasing control for decreasing the engine output taking onto account the driver's intention of applying a braking effort in a case where the accelerator pedal and the brake pedal are depressed or actuated simultaneously, and in addition, according to the method for estimating the brake pedal depressing force of the present invention, it is possible to appropriately estimate the brake pedal depressing force based on the master vac negative pressure and the brake working fluid pressure.

BRIEF DESCRIPTION OF THE SEVERAL VIEWS OF THE DRAWINGS

FIG. 7 is a diagrammatic illustration of a table depicting an accelerator position change gain applied in one embodiment of the present invention.

FIG. 12 is a flowchart depicting a H&T determination flag setting process performed when a BOS control is executed in one embodiment of the present invention.

FIG. 13 depicts an example of a time chart when a control according to one embodiment of the present invention is performed.

DETAILED DESCRIPTION OF THE INVENTION

With reference to the accompanying drawings, an engine control device according to one embodiment of the present invention will now be described.

<System Configuration>

Figure 1:
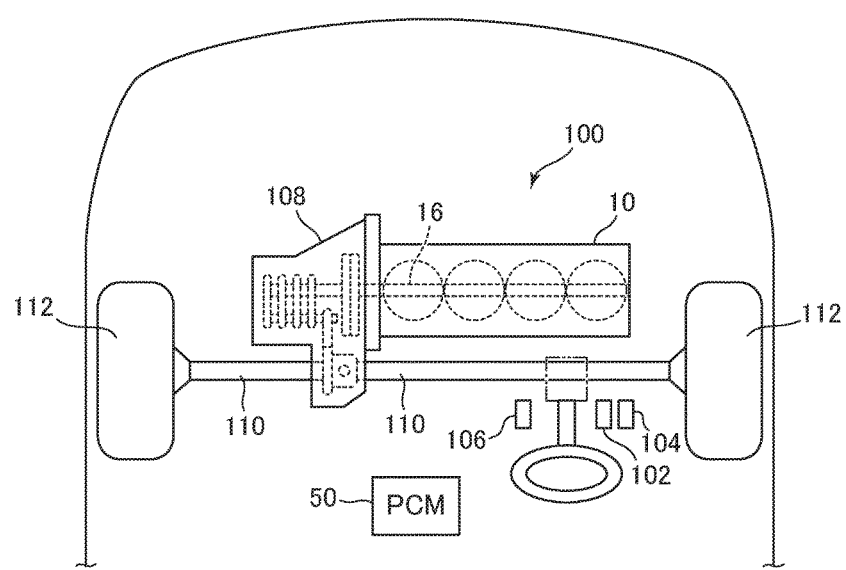
FIG. 1 is a plan view depicting a schematic configuration of a vehicle to which an engine control device according to one embodiment of the present invention is applied.

First of all, with reference to FIGS. 1 and 2, description will be made on a system configuration to which an engine control device according to one embodiment of the present invention is applied. FIG. 1 is a plan view depicting the schematic configuration of a vehicle to which an engine control device according to one embodiment of the present invention is applied, and FIG. 2 is a schematic configuration diagram of an engine system to which an engine control device according to one embodiment of the present invention is applied.

As shown in FIG. 1, in the vehicle, an engine 10 of an engine system 100 produces engine torque (drive torque) that is a driving force of the vehicle by burning fuel-air mixture, and transmits such engine torque to a transmission 108 via a crankshaft 16. Such transmission 108 is a mechanism which can shift gear stages to a plurality of levels (1st to 6th stages, for example), and the engine torque from the engine 10 is transmitted via a pair of drive shafts 110, at the gear stage set in the transmission 108, to a pair of wheels 112 mounted on outer ends of each of the drive shafts 110 in a widthwise direction of the vehicle. Specifically, the transmission 108 is a manual transmission in which gear stages are arbitrarily selected by a driver.

In addition, there are provided a brake pedal 102, an accelerator pedal 104 and a clutch pedal 106 on the vehicle, and the driver drives the vehicle by operating such brake pedal 102, accelerator pedal 104 and clutch pedal 106. In addition, a PCM (Powertrain Control Unit) 50 is provided on the vehicle for performing various controls in the vehicle. In the present embodiment, the PCM 50 functions as an engine control device, and functions to perform a control to the engine 10.

Figure 2:
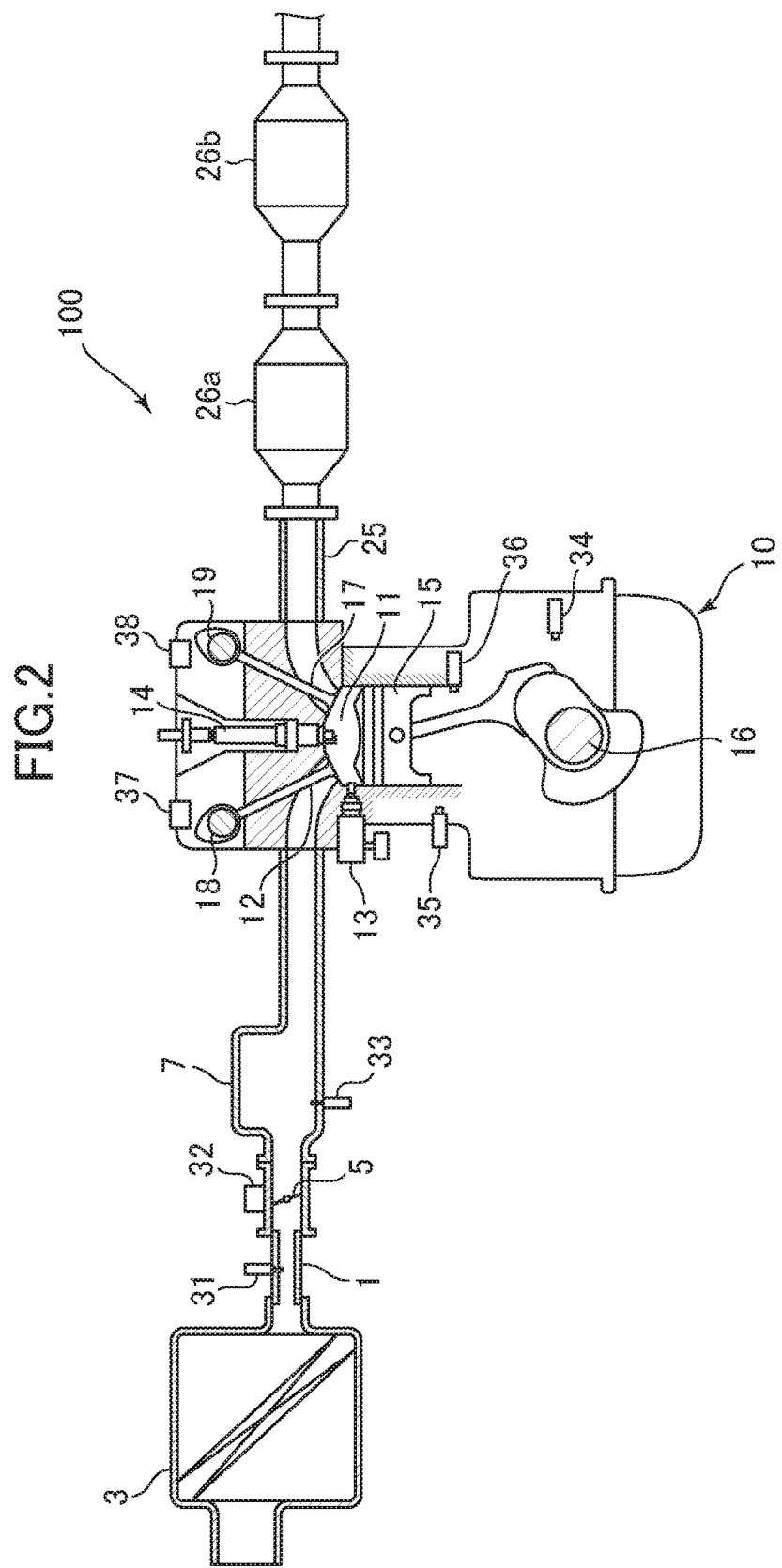
FIG. 2 is a schematic configuration diagram of an engine system to which an engine control device according to one embodiment of the present invention is applied.

As shown in FIG. 2, the engine system 100, mainly, comprises an intake air channel 1 through which intake air introduced from outside (air) passes, the aforementioned engine 10 (specifically, a gasoline engine) for burning the fuel-air mixture of the intake air supplied from such air intake channel 1 and a fuel supplied from a fuel injector 13 described in the followings to generate power for the vehicle, an exhaust gas channel 25 for discharging exhaust gas generated by the combustion in the engine 10, sensors 31 to 38 for detecting various parameters related to the engine system 100, and the aforementioned PCM 50 for controlling the entire engine system 100.

On the air intake channel 1, there are provided, starting from the upstream side, an air cleaner 3 for cleaning intake air introduced from outside, a throttle valve 5 for adjusting the amount of passing intake air (the amount of incoming air), and a surge tank 7 for temporarily storing intake air to be supplied to the engine 10.

The engine 10, mainly, comprises an air intake valve 12 for introducing the intake air supplied from the air intake channel 1 to a combustion chamber 11, a fuel injector 13 for injecting fuel into the combustion chamber 11, an ignition plug 14 for igniting the fuel-air mixture of the intake air and the fuel supplied to the combustion chamber 11, a piston 15 which performs reciprocating motion under the combustion of fuel-air mixture inside the combustion chamber 11, a crank shaft 16 rotated by the reciprocating motion of the piston 15, and an exhaust gas valve 17 for discharging exhaust gas generated by the combustion of fuel-air mixture inside the combustion chamber 11 to the exhaust gas channel 25.

In addition, the engine 10 is configured to vary respective operation timings (corresponding to phases of the valve) of each of the air intake valve 12 and the exhaust gas valve 17 by a variable air intake valve mechanism 18 and a variable exhaust gas valve mechanism 19, that is constituting a Variable Valve Timing Mechanism. Various types of publicly-known variable air intake valve mechanism 18 and variable exhaust gas valve mechanism 19 are applicable, but it is possible to vary the operation timing of the air intake valve 12 and the exhaust gas valve 17 using a mechanism configured as an electromagnetic type or a hydraulic type, for example.

On the exhaust gas channel 25, mainly, exhaust gas cleaning catalysts 26a, 26b having a function of cleaning the exhaust gas including such as a NOx catalyst and/or a ternary catalyst and/or an oxidation catalyst, for example, are provided.

In addition, in the engine system 100, there are provided sensors 31 to 38 for detecting various parameters related to the engine system 100. These sensors 31 to 38 are specifically described in the followings. The air flow sensor 31 functions to detect the amount of incoming air in terms of flow rate of the intake air which passes the intake air channel 1. The throttle position sensor 32 functions to detect the throttle position which is an opening of the throttle valve 5 determined by the position of the throttle valve 5. The pressure sensor 33 functions to detect an intake manifold pressure corresponding to the pressure of the intake air supplied to the engine 10. The crank angle sensor 34 functions to detect a crank angle of the crank shaft 16. The water temperature sensor 35 functions to detect a water temperature which is the temperate of the cooling water for cooling the engine 10. The temperature sensor 36 functions to detect the temperature inside the cylinder of the engine 10. Each of cam angle sensors 37, 38 functions to detect the operation timing including valve closing timing of the air intake valve 12 and the exhaust gas valve 17 respectively.

Figure 3:
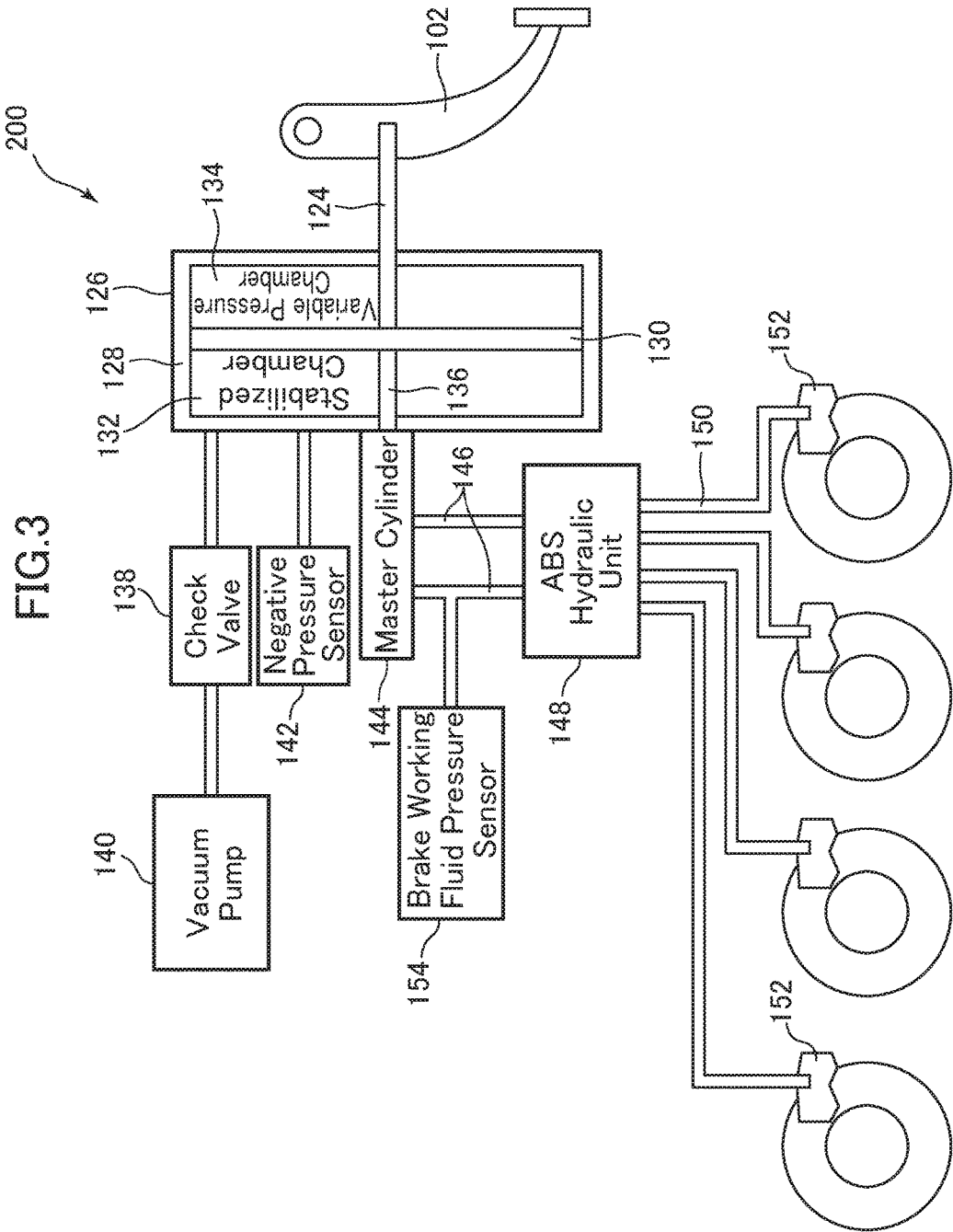
FIG. 3 is a schematic configuration diagram of a brake system in a vehicle to which an engine control device according to one embodiment of the present invention is applied.

Next, with reference to FIG. 3, the above described hydraulic brake system applied to a vehicle will be described. FIG. 3 is a schematic configuration diagram of a brake system in a vehicle to which an engine control device according to one embodiment of the present invention is applied.

As shown in FIG. 3, a brake system 200 conducts an operation corresponding to the depression or actuation of the brake pedal 102 (refer also to FIG. 1). A master vac 126 is coupled to such brake pedal 102 via an input rod 124. The master vac 126 comprises a hollow cylindrical housing 128, the inner space of the housing 128 being partitioned by a diaphragm 130 into a stabilized chamber 132 having an internal pressure which is kept negative, and a variable pressure chamber 134 having an internal pressure which changes by having a negative pressure supplied or having an atmosphere introduced, in accordance with the actuation of the brake pedal 102. In addition, the input rod 124 and an output rod 136 are coupled to the diaphragm 130.

Further, the term "negative pressure" refers to a state where the pressure is lower than the atmospheric pressure. In addition, the term "the negative pressure is high" refers to a condition wherein "the pressure is low," and the term "the negative pressure is low" refers to a condition wherein "the pressure is high".

A vacuum pump 140 is connected to the stabilized chamber 132 of the master vac 126 via a check valve 138. The vacuum pump 140 is controlled in accordance with the state of the vehicle by a predetermined control unit (for example, the PCM 50) to increase the negative pressure of the stabilized chamber 132. Further, a negative pressure sensor 142 which functions to detect the negative pressure of the stabilized chamber 132 (the master vac negative pressure) is connected to the stabilized chamber 132.

In addition, a master cylinder 144 is coupled to the master vac 126 via the output rod 136. Piping 146 for transmitting a brake working fluid pressure (braking hydraulic pressure) generated in the master cylinder 144 is connected to the master cylinder 144, and an ABS (Anti-lock Braking System) hydraulic unit 148 is connected to the piping 146. The ABS hydraulic unit 148 functions, in a case where any wheel 112 is locked (in other words, in a case where any wheel 112 skids), to repeat, in a short time, a control of forcibly decreasing the brake working fluid pressure to thereby release the wheel 112 from the locked condition, and then, of increasing the brake working fluid pressure once again. In addition, a wheel cylinder 152 is connected to the ABS hydraulic unit 148 via piping 150 so that the brake working fluid pressure adjusted in the ABS hydraulic unit 148 may be supplied to the wheel cylinder 152. In addition, a brake working fluid pressure sensor 154 which functions to detect the brake working fluid pressure is connected to the piping 146 between the master cylinder 144 and the ABS hydraulic unit 148.

Further, in the above description, there has been shown a configuration in which the vacuum pump 140 is used for producing negative pressure in the stabilized chamber 132 of the master vac 126, but instead of using the vacuum pump 140, it is possible to use a negative pressure of the intake air of the engine 10 for producing the negative pressure in the stabilized chamber 132 of the master vac 126.

Figure 4:
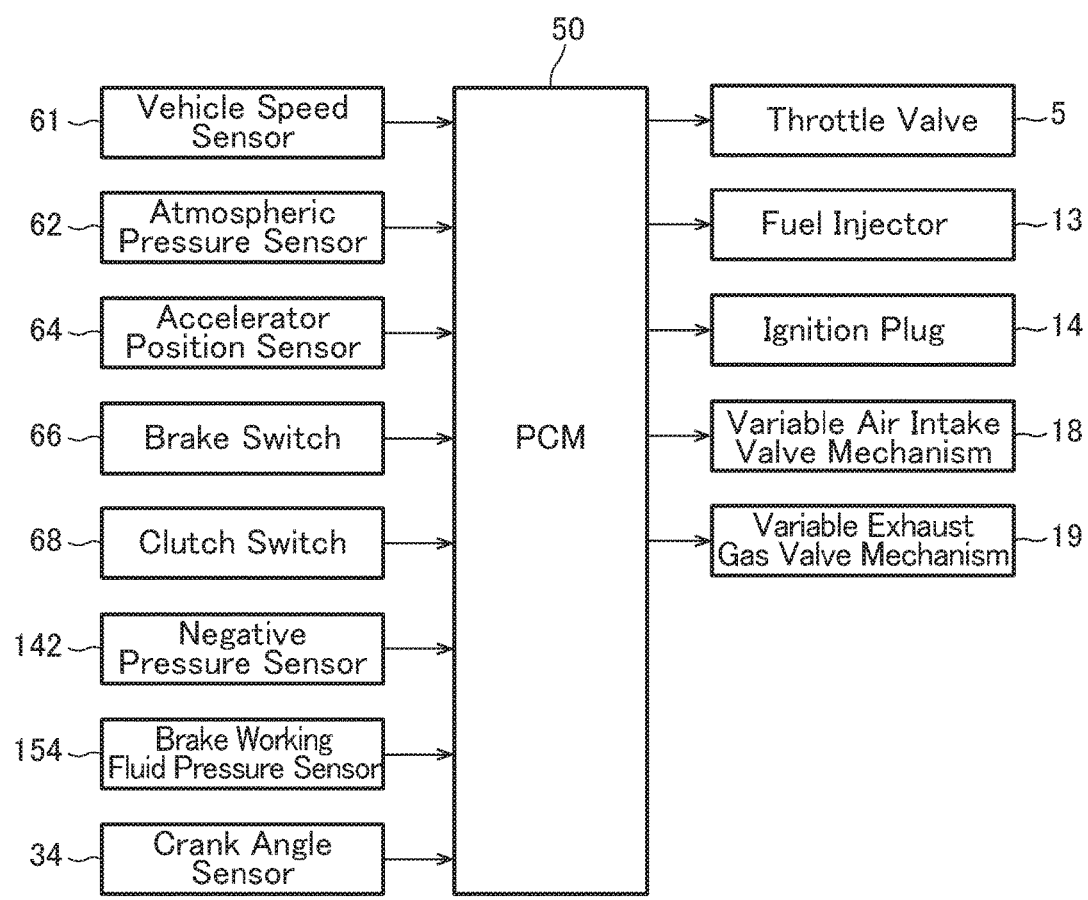
FIG. 4 is a block diagram depicting an electrical system of an engine control device according to one embodiment of the present invention.

Next, with reference to FIG. 4, description will be made on an electrical system of an engine control device according to one embodiment of the present invention. FIG. 4 is a block diagram depicting an electrical system of an engine control device (PCM 50) according to one embodiment of the present invention.

According to the present embodiment, the PCM 50 as the engine control device receives detection signals which are respectively provided from, mainly, a vehicle speed sensor 61 which functions to detect the vehicle speed, an atmospheric pressure sensor 62 which functions to detect the atmospheric pressure, an accelerator position sensor 64 which functions to detect the accelerator position which is the position of the accelerator pedal 104 (corresponding to the amount depressed or actuated by the accelerator pedal 104), a brake switch 66 which is adapted to be switched between ON/OFF positions in accordance with actuation/release of the brake pedal 102, a clutch switch 68 which is adapted to be switched between ON/OFF positions in accordance with actuation/release of the clutch pedal 106, the negative pressure sensor 142 (refer to FIG. 3) which functions to detect the master vac negative pressure, the brake working fluid pressure sensor 154 (refer to FIG. 3) which functions to detect the brake working fluid pressure, and the crank angle sensor 34 (refer to FIG. 2) which functions to detect a crank angle of the crank shaft 16.

In addition, the PCM 50 functions to perform a control of the engine 10 based on such detection signals. Specifically, the PCM 50 functions to control the opening and closing timing and/or the position of the throttle valve 5, control the fuel injection amount and/or fuel injection timing of the fuel injector 13, control the ignition timing of the ignition plug 14, control the operation timing of the air intake valve 12 and the exhaust gas valve 17 by the variable air intake valve mechanism 18 and the variable exhaust gas valve mechanism 19. More particularly, according to the present embodiment, when both the brake pedal 102 and the accelerator pedal 104 are depressed or actuated simultaneously, the PCM 50 functions to execute a control for forcibly decreasing the engine output (the BOS control) without applying the engine output corresponding to the operation of the accelerator pedal 104 by the driver.

The above components of the PCM 50 are functionally realized by a computer which comprises a CPU, various programs (including a basic control program such as an OS, and an application program capable of being activated on the OS to realize a specific function) to be interpreted and executed by the CPU, and an internal memory such as ROM or RAM storing therein the programs and a variety of data.

Further, while details will be described in the followings, the PCM 50 is capable of functioning as a "master vac negative pressure acquiring unit," "brake working fluid pressure acquiring unit,", "necessity determining unit" and "engine controlling unit". In addition, the PCM 50 is capable of functioning as a system to execute the "method for estimating a brake pedal depressing force" in the present invention.

<Engine Control Process>

Figure 5:
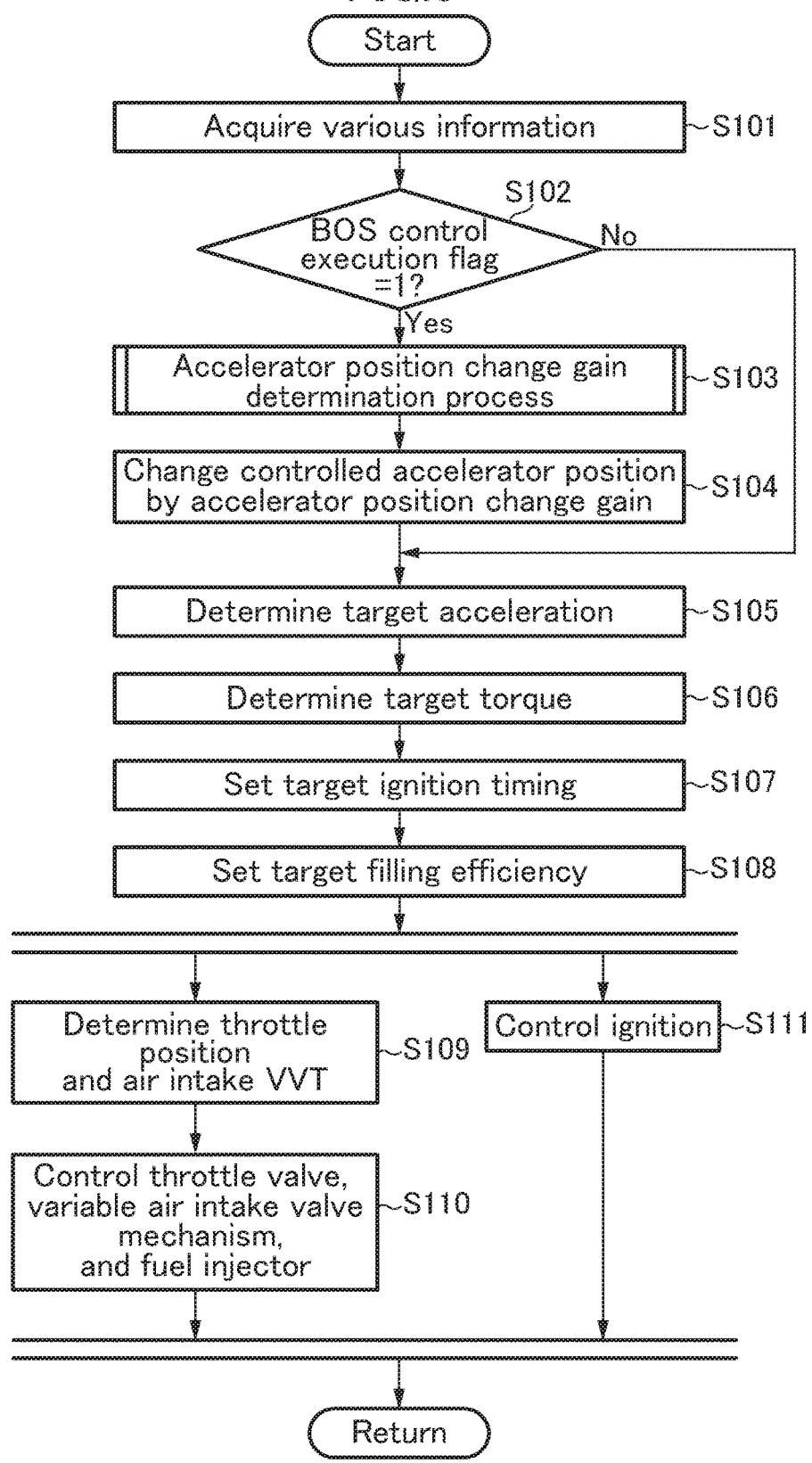
FIG. 5 is a flowchart depicting an engine control process according to one embodiment of the present invention.

Next, with reference to FIG. 5, description will be made on an engine control process executed by an engine control device according to one embodiment of the present invention. FIG. 5 is a flowchart depicting an engine control process according to one embodiment of the present invention. The process flow is activated when an ignition switch of a vehicle is turned on to apply power to the control system (PCM 50) of an engine, and is repeatedly executed with a given cycle period.

When the engine control process is started, in step S101, the PCM 50 functions to acquire various information signals of the vehicle. Specifically, the PCM 50 functions to acquire one or more of the accelerator position signal detected by the accelerator position sensor 64, the vehicle speed signal detected by the vehicle speed sensor 61, a signal of engine speed corresponding to the crank angle signal detected by the crank angle sensor 34, and a signal representing the gear stage currently set in the transmission 108 of the vehicle. In addition, the PCM 50 functions to read a BOS control execution flag which indicates necessity of the BOS control execution. Such BOS control execution flag is set by a process (a BOS control execution flag setting process) shown in FIG. 8 which will be described in the followings, wherein the flag is set to "1" if it is determined that execution of the BOS control is necessary, and set to "0" if it is determined that execution of the BOS control is not necessary.

Subsequently, in step S102, the PCM 50 functions to determine as to whether the BOS control execution flag acquired in the step S101 is "1" or not. As a result, when the BOS control execution flag is "1" (the step S102: Yes), the process proceeds to step S103, wherein the PCM 50 functions to execute an accelerator position change gain determination process for determining the gain (hereinafter referred as an "an accelerator position change gain") which is to be applied to change the accelerator position used for the engine control when the BOS control is being executed.

According to the present embodiment, in executing the BOS control, use is made of the accelerator position (hereinafter, appropriately referred as a "controlled accelerator position") which has been changed by a rate of change corresponding to a predetermined gain defined in advance, not the actual accelerator position detected by the accelerator position sensor 64, to thereby control the engine 10. Further, details of the accelerator position change gain determination process of the step S103 will be described in the followings with reference to FIG. 6.

Subsequently, in step S104, the PCM 50 functions to change (decrease or increase) the controlled accelerator position in accordance with the accelerator position change gain determined in the accelerator position change gain determination process of the step S103. The PCM 50 is configured to use the controlled accelerator position set as described above in the subsequent process. Then, the process proceeds to step S105.

On the other hand, when the BOS control execution flag acquired in the step S101 is not "1" (step S102: No), in other words, when the BOS control execution flag is "0," the PCM 50 proceeds to the step S105 without performing the above described processes of the steps S103 and S104. In such case, since the BOS control is not executed, the PCM 50 functions to use the actual accelerator position detected by the accelerator position sensor 64 directly, not the controlled accelerator position corresponding to the accelerator position change gain to thereby control the engine 10.

Subsequently, in the step S105, the PCM 50 functions to set a target acceleration based on the driving state of the vehicle acquired in the step S101. Specifically, the PCM 50 functions to select, from a plurality of acceleration characteristic maps defined with respect to various vehicle speeds and various transmission gear stages (the maps are created in advance and stored in a memory or the like), one acceleration characteristic map corresponding to a current vehicle speed and a current transmission gear stage, and determine the target acceleration in accordance with the actual accelerator position detected by the accelerator position sensor 64 or the controlled accelerator position set in the step S104, with reference to the selected acceleration characteristic map.

Subsequently, in step S106, the PCM 50 functions to determine the target torque of the engine 10 for realizing the target acceleration determined in the step S105. In this case, the PCM 50 functions to determine the target torque within a torque range which can be produced by the engine 10, based on the current vehicle speed, the transmission gear stage, road grade, road surface friction (μ), etc.

Subsequently, in step S107, the PCM 50 functions to set a target ignition timing executed by the ignition plug 14 in accordance with the current engine speed acquired in the step S101 and the driving state of the engine 10 including the target torque determined in the step S106. Specifically, the PCM 50 functions to calculate a target indicated torque produced by adding loss torque due to a friction loss and/or a pumping loss to the target torque, and select, from a plurality of ignition advance maps defining a relationship between the ignition timing and the indicated torque with respect to various charging efficiency and various engine speed (the maps are created in advance and stored in a memory or the like), the ignition timing advance map which corresponds to the current engine speed and from which the target indicated torque can be acquired in the vicinity of MBT, and set the target ignition timing corresponding to the target indicated torque, with reference to the selected ignition advance map. Further, when a knocking is occurring, the PCM 50 may operate to correct the target ignition timing set as described above to a retarded timing side.

Subsequently, in step S108, the PCM 50 functions to set a target charging efficiency for causing the engine 10 to output the target torque determined in the step S106. Specifically, the PCM 50 functions to determine a required mean effective pressure required for outputting the above described target indicated torque as well as the heat value (required heat value) corresponding to the required mean effective pressure to determine the target charging efficiency based either on a basic heat efficiency or an actual heat efficiency, and the required heat value, in accordance with a dimensional relationship between the heat efficiency (basic heat efficiency) on a condition set in the above described target ignition timing and the heat efficiency (actual heat efficiency) under the actual driving state of the engine 10. Further, the PCM 50 functions to appropriately limit the target charging efficiency determined as described above based on the required mean effective pressure etc.

Subsequently, in step S108, the PCM 50 functions to determine the position of the throttle valve 5 and the opening and closing timing of the air intake valve 12 via the variable air intake valve mechanism 18 taking into account the air amount detected by the air flow sensor 31 so that the air corresponding to the target charging efficiency set in the step S108 can be introduced to the engine 10.

Subsequently, in step S110, the PCM 50 functions to control the throttle valve 5 and the variable air intake valve mechanism 18 based on the throttle position and the opening and closing timing of the air intake valve 12 determined in the step S109, and also to control the fuel injector 13 based on the actual air amount estimated based on the target equivalent amount determined based on the operating state or the like of the engine 10 and the air amount or the like detected by the air flow sensor 31.

Further, in parallel with the processes of the steps S109 and S110, in the step S111, the PCM 50 functions to control the ignition plug 14 so that the ignition event can be performed at the target ignition timing set in the step S107.

Figure 6:
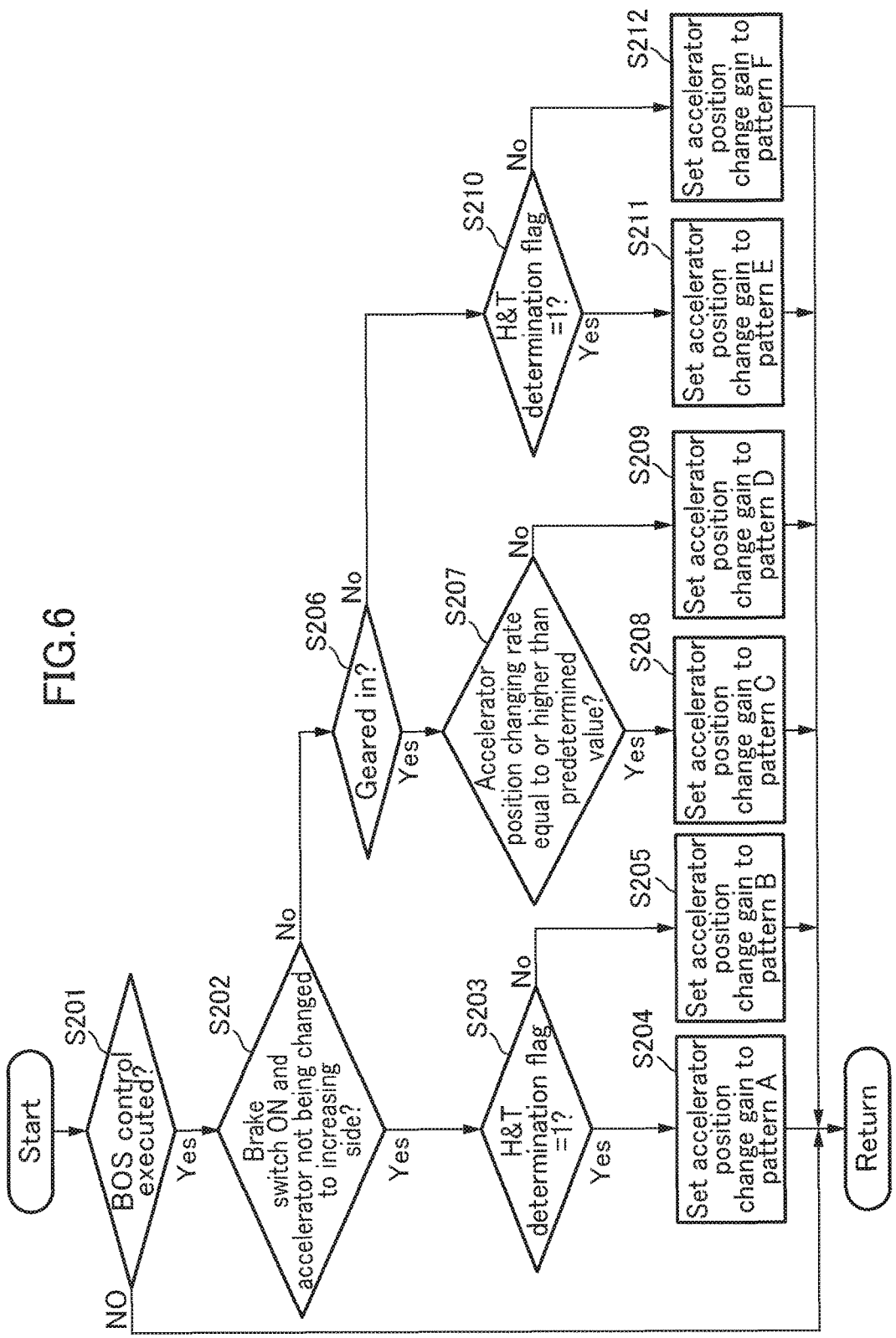
FIG. 6 is a flowchart depicting an accelerator position change gain determination process according to one embodiment of the present invention.

Next, with reference to FIGS. 6 and 7, description will be made on the accelerator position change gain determination process executed in the step S103 of FIG. 5. FIG. 6 is a flowchart depicting the accelerator position change gain determination process according to one embodiment of the present invention, and FIG. 7 is a diagrammatic illustration of a table depicting the accelerator position change gain applied in one embodiment of the present invention. It should further be noted that FIG. 7 shows a dimensional relationship of the accelerator position change gain, and in an actual execution, the accelerator position change gain is represented by a predetermined numerical value. For example, the numerical value corresponding to the accelerator position change gain is multiplied to the accelerator position (the actual accelerator position) detected by the accelerator position sensor 64 to thereby determine the above described controlled accelerator position (refer to the step S104 of FIG. 5).

When the accelerator position change gain determination process is started, in step S201, the PCM 50 functions to determine as to whether the BOS control is currently being executed or not. In other words, the PCM 50 functions to determine as to whether the BOS control, which forcibly decreases the engine output, is being executed because of the simultaneous depression or actuation of both the brake pedal 102 and the accelerator pedal 104 is being occurred.

Further, the BOS control is executed when the BOS control execution flag is "1," but basically, the BOS control execution flag is switched from "1" to "0" when the accelerator position is shifted to a position which is of a value equal to or lower than the predetermined value, and the BOS control is terminated at this point of time. Thus, once the BOS control is executed, if the accelerator position is larger than the predetermined value, the BOS control is continued, even if the brake pedal 102 is not depressed or actuated (the BOS control execution flag is kept as "1".).

As a result of the determination in the step S201, if it is determined that the BOS control is currently executed (the step S201: Yes), the process proceeds to step S202, and if it is determined that the BOS control is currently not executed (the step S201: No), the process is terminated.

In the step S202, the PCM 50 functions to determine as to whether the brake switch 66 is ON and the accelerator position is not being changed to the increasing side, based on the detection signal from the brake switch 66 and the accelerator position sensor 64 (in other words, whether the accelerator position is not being changed to the depressed amount increasing side). The case herein referred as "the accelerator position is not being changed to the increasing side" includes a case not only where the accelerator position is changed to the decreasing side, but also where the accelerator position is not being changed.

As a result of the determination in the step S202, if it is determined that the brake switch 66 is ON and the accelerator position is not being changed to the increasing side (the step S202: Yes), the process proceeds to step S203, and the PCM 50 functions to determine as to whether the H&T determination flag which indicates the determination result with respect to a heel-and-toe operation by the driver is "1" or not. The H&T determination flag is set by processes described in later with reference to FIGS. 11 and 12 (H&T determination flag setting process), and if it is determined that the heel-and-toe operation is being executed, the flag is set to "1," and if it is determined that the heel-and-toe operation is not being executed, the flag is set to "0".

Further, the heel-and-toe operation is the operation performed by depressing or actuating the brake pedal 102, the accelerator pedal 14 and the clutch pedal 106 simultaneously. Basically, the heel-and-toe operation corresponds to the operation of depressing the accelerator pedal 104, with the brake pedal 102 and the clutch pedal 106 being depressed or actuated. Typically, it is the operation in which, when downshifting operation is being made in a MT car, while the brake pedal 102 is depressed or actuated with the right foot to decelerate the car, the clutch pedal 106 is depressed or actuated with the left foot to disengage the clutch, and with these pedals being depressed or actuated (more particularly, the right foot is depressing or actuating the brake pedal 102 with the toe), the accelerator pedal 104 is depressed or actuated with the right heel to synchronize the engine speed and the transmission. In such case, while the brake pedal 102 is depressed or actuated for decelerating the vehicle, the following operations are performed in a manner such as: (1) the clutch pedal 106 is depressed or actuated to disengage the clutch, (2) the accelerator pedal 104 is depressed or actuated to cause the engine speed to match with the vehicle speed of the gear stage to which the transmission is to be shifted, (3) the shift lever is operated for shifting the transmission to the desired gear stage, and (4) the clutch pedal 106 is released to engage the clutch.

As a result of the determination in the above described step S203, if it is determined that the H&T determination flag is "1" (step S203: Yes), the process proceeds to step S204, and the PCM 50 functions to set the accelerator position change gain to pattern A, and on the contrary, if it is determined that the H&T determination flag is not "1," in other words, if the H&T determination flag is "0," the process proceeds to step S205, and the PCM 50 functions to set the accelerator position change gain to pattern B (refer to FIG. 7).

The pattern B is the accelerator position change gain which is applied during a normal BOS control (specifically, in a case where the heel-and-toe operation is not performed during the BOS control), and it is defined as that the controlled accelerator position is decreased with a relatively small rate of change (a moderate gradient). Such pattern B is defined as that the controlled accelerator position is decreased with the relatively moderate gradient in view of suppressing a shock caused by a rapid change of the engine output when the engine output is limited so as to secure the security when both the brake pedal 102 and the accelerator pedal 104 are depressed or actuated simultaneously.

On the other hand, the pattern A is the accelerator position change gain which is applied when the heel-and-toe operation is being performed during the BOS control, and it is defined as that the controlled accelerator position is decreased with a relatively large rate of change (a sharp gradient), specifically the rate of change larger than that of the pattern B. The accelerator position change gain of the pattern A is defined as such in order to promptly realize adjustment of the engine speed by the heel-and-toe operation by decreasing the controlled accelerator position in a prompt manner corresponding to the accelerator actuation to the decreasing side by the driver, in view of giving priority to the driver's intention of performing the heel-and-toe operation (specifically, decreasing the engine speed), than limiting the engine output by the BOS control.

On the other hand, as a result of the determination in the step S202, if it is not determined that the brake switch 66 is ON and the accelerator position is not being changed to the increasing side (the step S202: No), in other words, when the brake switch 66 is OFF and/or the accelerator position is being changed to the increasing side (in other words, when the accelerator position is being changed to the depressed amount increasing side), the process proceeds to step S206. In step S206, the PCM 50 functions to determine as to whether the transmission 108 is in a state with the gear engaged to a predetermined gear position.

As a result of the determination in the step S206, if it is determined that the transmission 108 is in the gear engaged state (S206: Yes), in other words, in a case where it is in the state where the engine torque is being transmitted via the transmission 108, the process proceeds to step S207. In such case, since the clutch pedal 106 is not being depressed or actuated, it may be understood that the heel-and-toe operation is not being performed. In the step S207, the PCM 50 functions to determine as to whether the accelerator position changing rate is of a value equal to or higher than the predetermined value, in other words, determine as to whether the accelerator position changing rate is of a value equal to or higher than the predetermined value when the accelerator pedal 104 is depressed or actuated, based on the detection signal from the accelerator position sensor 64.

As a result of the determination in the step S207, if it is determined that the accelerator position changing rate is of a value equal to or higher than the predetermined value (the step S207: Yes), the process proceeds to step S208, and the PCM 50 functions to set the accelerator position change gain to pattern C, and on the other hand, if it is not determined that the accelerator position changing rate is of a value equal to or higher than the predetermined value (the step S207: No), in other words, if the accelerator position changing rate is less than the predetermined value, the process proceeds to step S209, and the PCM 50 functions to set the accelerator position change gain to pattern D (refer to FIG. 7). Both the patterns C and D are the accelerator position change gain respectively applied during the normal BOS control (specifically, in a case where the heel-and-toe operation is not being performed during the BOS control), and defined so as to increase the controlled accelerator position. Specifically, the pattern C is defined so as to increase the controlled accelerator position with the rate of change larger than that of the pattern D, in view of giving priority to the depressing or actuating operation of the accelerator pedal 104 by the driver.

On the other hand, as a result of the determination in the step S206, if it is not determined that it is in the gear engaged state (the step S206: No), in other words, when the transmission 108 is set to a neutral state (a neutral position), the process proceeds to step S210. In the step S210, the PCM 50 functions to determine as to whether the H&T determination flag is "1".

As a result of the determination in the step S210, if it is determined that the H&T determination flag is "1" (the step S210: Yes), the process proceeds to step S211, and the PCM 50 functions to set the accelerator position change gain to pattern E, and on the contrary, if it is determined that the H&T determination flag is not "1" (the step S210: No), in other words, when the H&T determination flag is "0," the process proceeds to step S212, and the PCM 50 functions to set the accelerator position change gain to pattern F (refer to FIG. 7).

The pattern F is the accelerator position change gain which is applied during the normal BOS control (specifically, in a case where the heel-and-toe operation is not being performed during the BOS control), and it is defined as that the controlled accelerator position is increased with a relatively small rate of change (a moderate gradient). Such pattern F is defined as that the controlled accelerator position is increased with a relatively moderate gradient in view of suppressing the shock which may otherwise be caused by the rapid change of the engine output when the engine output is limited in order to secure the security in a case where both the brake pedal 102 and the accelerator pedal 104 are depressed or actuated simultaneously.

On the other hand, the pattern E is the accelerator position change gain which is applied when the heel-and-toe operation is being performed during the BOS control, and it is defined as that the controlled accelerator position is increased with a relatively large rate of change (a sharp gradient), specifically the rate of change larger than that of the pattern F and the above described pattern C. The accelerator position change gain of the pattern E is defined as such in order to promptly realize adjustment of the engine speed by the heel-and-toe operation by increasing the controlled accelerator position in a prompt manner corresponding to the accelerator actuation to the increasing side by the driver, in view of giving priority to the driver's intention of performing the heel-and-toe operation (specifically, increasing the engine speed), than limiting the engine output by the BOS control.

Further, while the pattern E is what to be applied when the heel-and-toe operation is performed during the BOS control similar to the pattern A described above, preferably, the value (absolute value) of the rate of change of the controlled accelerator position in the pattern E may be made larger than the value (absolute value) of the rate of change of the controlled accelerator position in the pattern A. This operation is done for making the rate of change for increasing the engine speed using the pattern E larger than the rate of change for decreasing the engine speed using the pattern A.

<BOS Control Execution Flag Setting Process>

Figure 8:
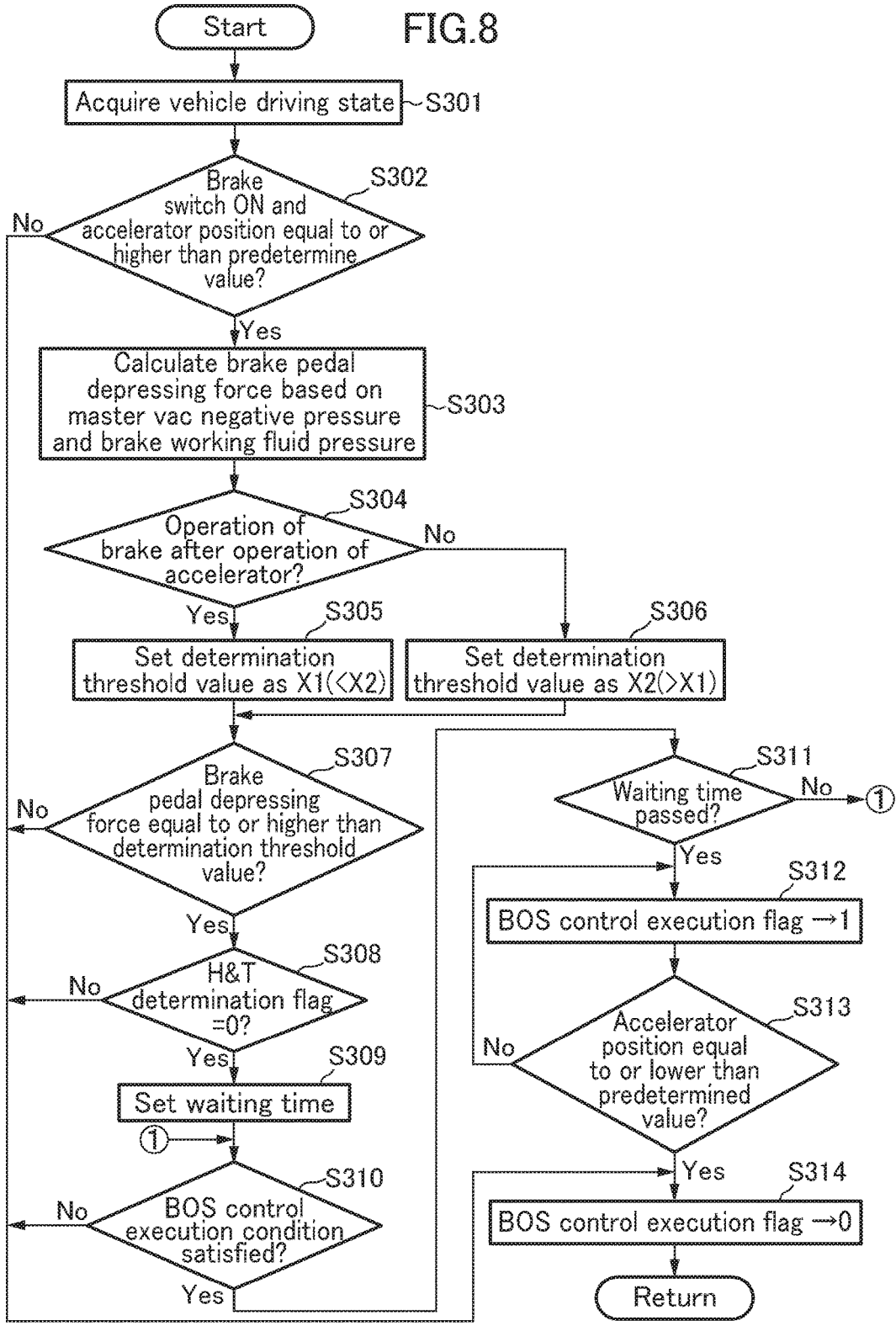
FIG. 8 is a flowchart depicting a BOS control execution flag setting process according to one embodiment of the present invention.

Next, with reference to FIG. 8, the above described BOS control execution flag setting process will be described. FIG. 8 is a flowchart depicting the BOS control execution flag setting process according to one embodiment of the present invention. The BOS control execution flag setting process is executed in parallel with the engine control process described with reference to FIG. 5. In addition, it is assumed that the BOS control execution flag setting process is basically executed from the state where the BOS control execution flag is "0".

In step S301 where the BOS control execution flag setting process is started, the PCM 50 functions to acquire signals representing various parameters on the driving state of a vehicle. More particularly, the PCM functions to acquire ON/OFF signal of the brake switch 66, the vehicle speed signal detected by the vehicle speed sensor 61, the engine speed signal corresponding to the crank angle signal detected by the crank angle sensor 34, the accelerator position signal detected by the accelerator position sensor 64, the master vac negative pressure signal detected by the negative pressure sensor 142, and the brake working fluid pressure signal detected by the brake working fluid pressure sensor 154.

Subsequently, in step S302, the PCM 50 functions to determine as to whether the brake switch 66 is ON and the accelerator position is of a value equal to or higher than the predetermined value. In other words, the PCM 50 functions to determine as to whether both the brake pedal 102 and the accelerator pedal 104 are depressed or actuated simultaneously. In addition, in the step S302, the PCM 50 functions to determine at the same time as to whether the engine speed is of a value equal to or higher than the predetermined value (for example, 100 rpm) and the vehicle speed is of a value equal to or higher than the predetermined value (for example, 10 km/h). As a result of the determination in the step S302, if all of the conditions that the brake switch 66 is ON, the accelerator position is of a value equal to or higher than the predetermined value, the engine speed is of a value equal to or higher than the predetermined value, and the vehicle speed is of a value equal to or higher than the predetermined value are satisfied (the step S302: Yes), the process proceeds to step S303. On the other hand, if any one of such conditions is not satisfied (the step S302: No), the process proceeds to step S314, and the PCM 50 functions to determine that it is not necessary to execute the BOS control, and set the BOS control execution flag to "0".

In the step S303, the PCM 50 functions to determine the brake pedal depressing force applied to the brake pedal 102 by the driver based on the master vac negative pressure and the brake working fluid pressure. In the present embodiment, in order to appropriately take into account the driver's intention of applying a braking effort in executing the BOS control in a case where both the brake pedal 102 and the accelerator pedal 104 are depressed or actuated simultaneously, the necessity of executing the BOS control is determined based on the brake pedal depressing force reflecting the driver's intention of applying the braking effort, not on the brake working fluid pressure etc.

Figure 9:
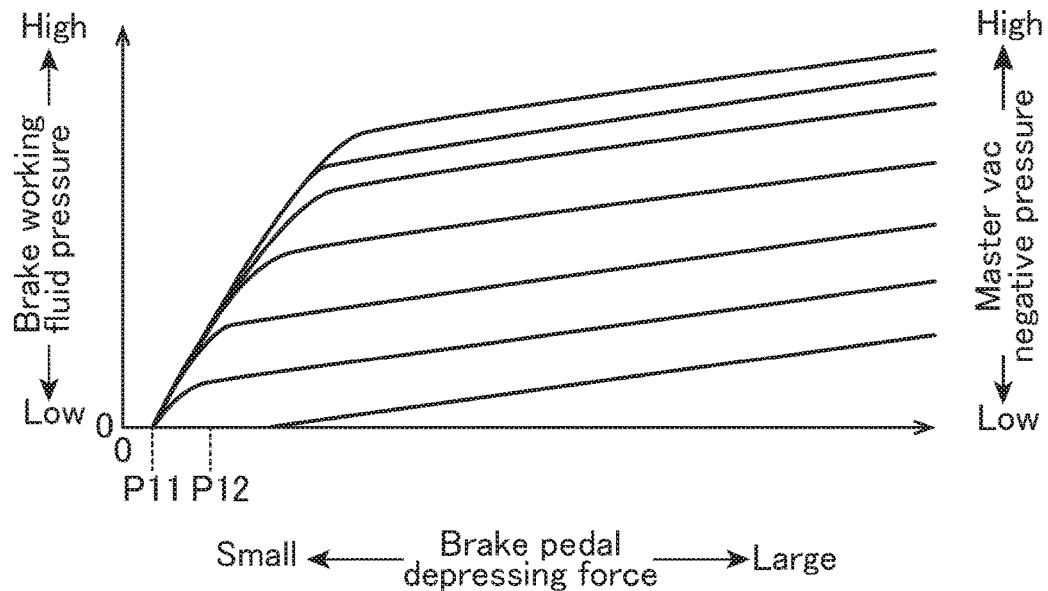
FIG. 9 is an illustrative diagram with respect to a method for determining a brake pedal depressing force based on a master vac negative pressure and a brake working fluid pressure in one embodiment of the present invention.

Here, with reference to FIG. 9, a method for determining a brake pedal depressing force based on a master vac negative pressure and a brake working fluid pressure in one embodiment of the present invention will be specifically described. FIG. 9 shows a relationship between the master vac negative pressure, the brake working fluid pressure and the brake pedal depressing force. Specifically, the relationship between the brake pedal depressing force and the brake working fluid pressure with respect to various master vac negative pressure is shown, wherein the brake pedal depressing force is shown by the horizontal axis, and the brake working fluid pressure axis is shown by the longitudinal axis. Such relationship between the master vac negative pressure, the brake pedal depressing force and the brake working fluid pressure is acquired by experiments and/or simulations, for example.

From FIG. 9, it is possible to note a trend that the brake pedal depressing force shows a smaller value as the master vac negative pressure becomes higher, and the brake pedal depressing force shows a larger value as the brake working fluid pressure becomes higher. More specifically, it is possible to note a trend that, under a condition where the brake working fluid pressure is maintained unchanged, the brake pedal depressing force shows a smaller value as the master vac negative pressure becomes higher, in other words, under the same brake working fluid pressure, the brake pedal depressing force shows a larger value as the master vac negative pressure becomes lower. In addition, it is possible to note a trend that, at the same master vac negative pressure, the brake pedal depressing force shows a larger value as the brake working fluid pressure becomes higher.

Returning to FIG. 8, the description of the process of the step S303 will be resumed. In the present embodiment, the relationship between the master vac negative pressure, the brake working fluid pressure and the brake pedal depressing force (such as a map defining the relationship between the brake working fluid pressure and the brake pedal depressing force with respect to a plurality of master vac negative pressure, for example) as shown in FIG. 9 is determined in advance, and in the step S303, the PCM 50 functions to determine the brake pedal depressing force corresponding to the master vac negative pressure currently detected by the negative pressure sensor 142 and the brake working fluid pressure currently detected by the brake working fluid pressure sensor 154, by referring to such relationship determined in advance.

Here, according to the relationship between the master vac negative pressure, the brake working fluid pressure and the brake pedal depressing force shown in FIG. 9, when the master vac negative pressure is of a value equal to or lower than the predetermine value, and the brake working fluid pressure is approximately 0, it is not possible to appropriately determine the brake pedal depressing force based on such relationship. Thus, in the step S303, the PCM 50 functions to acquire a signal on the brake pedal depressing force P11 as a fixed value in the case where the master vac negative pressure is of a value equal to or lower than the predetermine value, and the brake working fluid pressure is approximately 0. The case where the master vac negative pressure is of a value equal to or lower than the predetermine value is a situation which corresponds to a case where an abnormal condition has occurred in a channel for producing negative pressure in the master vac 126, and corresponds to a case where the master vac negative pressure is represented by the lowest line in the graph in FIG. 9, for example. In addition, in one example, for the above described brake pedal depressing force P11, the pedal depressing or depressing force corresponding to a brake working fluid pressure (for example, 20N) under which the braking effort starts to be applied, is applied. In another example, for the above described brake pedal depressing force P11, a pedal depressing or depressing force equal to or higher than the determination threshold value (50N in one example) used for determining the brake pedal depressing force in setting the BOS control execution flag is applied.

Subsequently, in step S304, the PCM 50 functions to determine as to whether the brake pedal 102 is depressed or actuated after the accelerator pedal 104 is depressed or actuated, in other words, whether an application of brake is performed after the accelerator actuation. As a result, if it is determined that the application of brake is performed after the accelerator actuation (the step S304: Yes), the process proceeds to step S305, and the PCM 50 functions to set a relatively small value X1 as the determination threshold value used for determining the brake pedal depressing force in setting the BOS control execution flag. On the contrary, if it is not determined that the application of brake is performed after the accelerator actuation (the step S304: No), in other words, when the accelerator actuation is performed after the application of brake, the process proceeds to step S306, and the PCM 50 functions to set a value X2 larger than the above described value X1 as the determination threshold value used for determining the brake pedal depressing force in setting the BOS control execution flag. For example, the pedal depressing or depressing force around the brake pedal depressing force P12 (in one example, 50N) shown in FIG. 9 is used as the determination threshold value X1, X2.

The reason why the determination threshold value to be set is made different in accordance with the sequence of operations by the brake pedal 102 and the accelerator pedal 104 as such is described in the followings. When the application of brake, that is, the brake application is performed after the accelerator actuation, the driver's intention of applying a braking effort is weaker than when the accelerator actuation is performed after the application of brake, and thus, the brake pedal depressing force tends to be small. In other words, when the accelerator actuation is performed after the application of brake, the driver's intention of applying a braking effort is stronger than when the application of brake is performed after the accelerator actuation, and thus, the brake pedal depressing force tends to be large. Therefore, if the same determination threshold value is used for both the cases when the application of brake is performed after the accelerator actuation and when the accelerator actuation is performed after the application of brake, it is not possible to appropriately determine the necessity of executing the BOS control based on the brake pedal depressing force. For example, under a situation where the determination threshold value is set to a value which is appropriate for the case where the accelerator actuation is performed after application of brake (the relatively large determination threshold value may be set), if the brake is applied after the accelerator actuation, the brake pedal depressing force tends to be smaller than the determination threshold value, and thus, there will be a higher probability of determining that the BOP control is not necessary to be executed, in other words, probability of the BOS control being executed may become low. On the other hand, if the determination threshold value is set to a value appropriate for the case where the brake application is performed after the accelerator actuation (the relatively small determination threshold value may be set), and the accelerator actuation is nevertheless performed after the brake application, the brake pedal depressing force tends to be larger than the determination threshold value, and thus, the probability of determining that the BOS control is necessary to be executed becomes higher, in other words, probability of the BOS control being executed may become high.

Therefore, in the present embodiment, for both of the cases where the brake application is performed after the accelerator actuation and where the accelerator actuation is performed after the brake application, the determination threshold value used for determining the brake pedal depressing force is made different in accordance with the sequence of operations by each of the brake pedal 102 and the accelerator pedal 102 to thereby appropriately determine the necessity of executing the BOS control based on the brake pedal depressing force, in other words, to determine the necessity of the BOS control, appropriately taking into account the driver's intention of applying a braking effort. Specifically, when the brake application is performed after the accelerator actuation, the determination threshold value is made smaller than when the accelerator actuation is performed after the brake application, in other words, when the accelerator actuation is performed after the brake application, the determination threshold value is made larger than when the brake application is performed after the accelerator actuation.

Subsequently, in step S307, the PCM 50 functions to determine as to whether the brake pedal depressing force determined in the step S303 is of a value equal to or higher than the determination threshold (X1 or X2) set in the steps S305 or S306. As a result, if it is determined that the brake pedal depressing force is of a value equal to or higher than the determination threshold value (step S307: Yes), the process proceed to step S308. On the other hand, if it is not determined that the brake pedal depressing force is of a value equal to or higher than the determination threshold value (step S307: No), in other words, if the brake pedal depressing force is less than the determination threshold value, the process proceed to step S314, and the PCM 50 functions to determine that it is not necessary to execute the BOS control, and set the BOS control execution flag to "0".

In step S308, the PCM 50 functions to determine as to whether the H&T determination flag, which indicates the determination result of the heel-and-toe operation by the driver, is "0". As described above, the H&T determination flag is set in the process (H&T determination flag setting process) shown later in FIGS. 11 and 12, and it is set to "1" if it is determined that the heel-and-toe operation is being executed, and set to "0" if it is determined that the heel-and-toe operation is not being executed.

As a result of the step S308, if it is determined that the H&T determination flag is "0" (the step S308: Yes), the process proceeds to step S309. On the other hand, if it is not determined that the H&T determination flag is "0" (the step S308: No), in other words, when the H&T determination flag is "1," the process proceeds to step S314, and the PCM 50 functions to set the BOS control execution flag to "0" in order to preferentially execute the engine control corresponding to the heel-and-toe operation by the driver than to execute the BOS control (in other words, the control for decreasing the engine output).

In the step S309, the PCM functions to set a waiting time before executing the BOS control. In the present embodiment, the BOP control execution flag is set to "1" when the waiting time in accordance with the driver's intention of applying a braking effort has passed after the conditions described above in the steps S302, S307 and S308 (hereinafter, such conditions are together appropriately referred as "BOS control execution condition") are satisfied, not just after the BOS control execution condition is satisfied.

Figure 10:
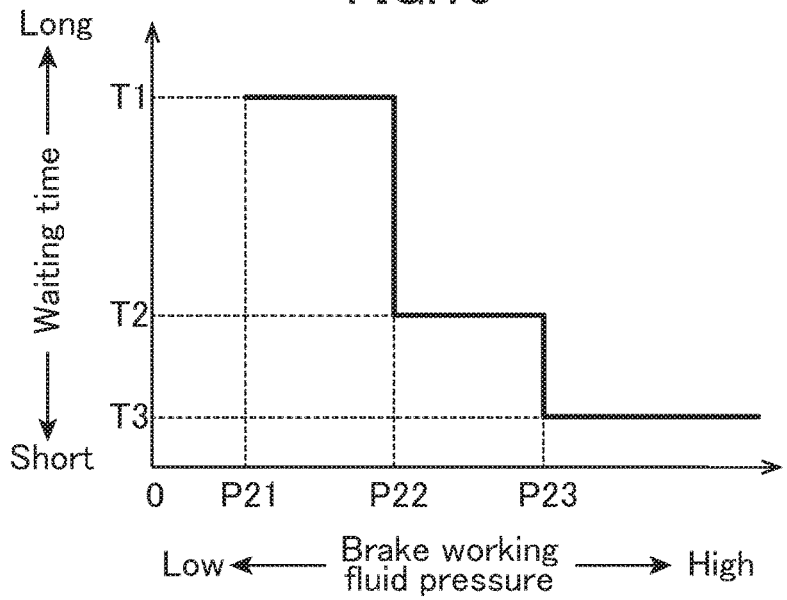
FIG. 10 is an illustrative diagram with respect to a method for setting a waiting time before executing a BOS control in one embodiment of the present invention.

Here, with reference to FIG. 10, a method for setting the waiting time before executing the BOS control in accordance with one embodiment of the present invention will be described. In FIG. 10, a map defining the waiting time to be set for the brake working fluid pressure is shown, wherein the brake working fluid pressure is shown by the horizontal axis, and the waiting time before executing the BOS control is shown by the longitudinal axis. According to the map shown in FIG. 10, a relatively long waiting time T1 (10 seconds, for example) is set for the brake working fluid pressure from P21 to P22, and a waiting time T2 shorter than T1 (3 seconds, for example) is set for the brake working fluid pressure from P22 to P23, and the waiting time T3 further shorter than T2 (1 second or shorter, for example) is set for the brake working fluid pressure exceeding P23. In addition, in a case where the brake working fluid pressure is less than P21, the BOP control is to be prohibited. For example, to the brake working fluid pressure P21, the brake working fluid pressure corresponding to the brake pedal depressing force when the brake switch is switched from OFF to ON (in one example 10N) is applied, whereas the brake working fluid pressure P22 is applied with the brake working fluid pressure corresponding to the brake pedal depressing force larger than the brake pedal depressing force under which the braking effort starts to be applied (in one example 30N) is applied to, and to the brake working fluid pressure P23, the brake working fluid pressure corresponding to the determination threshold of the above described brake pedal depressing force (in one example, 50N) is applied.

Thus, in the present embodiment, the waiting time is set to a value corresponding to the brake working fluid pressure which indicates the driver's intention of applying a braking effort. Specifically, when the driver's intention of applying a braking effort is strong, a short waiting time is set in order to promptly execute the BOS control, and when the driver's intention of applying a braking effort is weak, a long waiting time is set in order to execute the BOS control after a certain period of time.

Returning to FIG. 8, the description for the process of the step S309 is continued. In the step S309, the PCM 50 functions to set the waiting time corresponding to the brake working fluid pressure currently detected by the brake working fluid pressure sensor 154 with reference to the map to which the waiting time is corresponded for the brake working fluid pressure as shown in FIG. 10. Then, the PCM 50 functions to countdown the set waiting time.

Further, while the above description has been made on an example wherein the waiting time is determined based on the brake working fluid pressure, it is possible to determine the waiting time based on the brake pedal depressing force instead of the brake working fluid pressure. Specifically, use may be made of a map similar to FIG. 10 but defines the waiting time with respect to the brake pedal depressing force for setting the waiting time corresponding to the brake pedal depressing force determined in the step S303. In such case, a map may be provided by assigning values of the brake pedal depressing force which correspond to respective ones of the brake working fluid pressures P21, P22, P23 For example, the brake pedal depressing force corresponding to the brake working fluid pressure P23 may correspond to the "first predetermined value," the waiting time T3 may correspond to the "first waiting time," and the waiting time T2 may correspond to the "second waiting time," or alternatively, the brake pedal depressing force corresponding to the brake working fluid pressure P22 may correspond to the "first predetermined value," the waiting time T2 may correspond to the "first waiting time," and the waiting time T3 may correspond to the "second waiting time". Further, the brake pedal depressing force corresponding to the brake working fluid pressure P21 may correspond to the "second predetermined value". According to such modification, it is possible to determine the waiting time taking into account the driver's intention of applying a braking effort much further.

Subsequently, in step S310, the PCM 50 functions to determine once more as to whether the BOS control execution condition is satisfied during counting down the waiting time set in the step S309. As a result, if it is determined that the BOP control execution condition is satisfied (step S310: Yes), the process proceeds to step S311. On the other hand, if it is determined that the BOP control execution condition is not satisfied (step S310: No), the process proceeds to step S314, and the PCM 50 functions to determine that it is not necessary to execute the BOS control, and set the BOS control execution flag to "0".

In step S311, the PCM 50 functions to determine as to whether the waiting time has passed or not. As a result, if it is determined that the waiting time has passed (step S311, Yes), the process proceeds to step S312, and the PCM 50 functions to set the BOS control execution flag to "1". Then, the BOS control may be executed by the engine control process shown in FIG. 5. On the other hand, if it is determined that the waiting time has not passed (step S311, No), the process returns to the step S310. In such case, the PCM 50 functions to repeat the determination as to whether the BOS control execution condition is satisfied or not until the waiting time passes.

Subsequently, in the step S313, the PCM 50 functions to determine as to whether the accelerator position is of a value equal to or lower than the predetermined value based on the detection signal from the accelerator position sensor 64. In other words, the PCM 50 functions to determine as to whether the accelerator pedal 104 is released or not. As a result, if it is determined that the accelerator position is of a value equal to or lower than the predetermined value (step S313: Yes), the process proceeds to step S314, and the PCM 50 functions to switch the BOS control execution flag from "1" to "0". On the other hand, if it is not determined that the accelerator position is at or less than the predetermined value (step S313: No), in other words, if the accelerator position is larger than the predetermined value, the process returns to the step S312. In such case, the PCM 50 functions to keep the BOS control execution flag as "1" until the accelerator position becomes equal to or lower than the predetermined value.

<H&T Determination Flag Setting Process>

Figure 11:
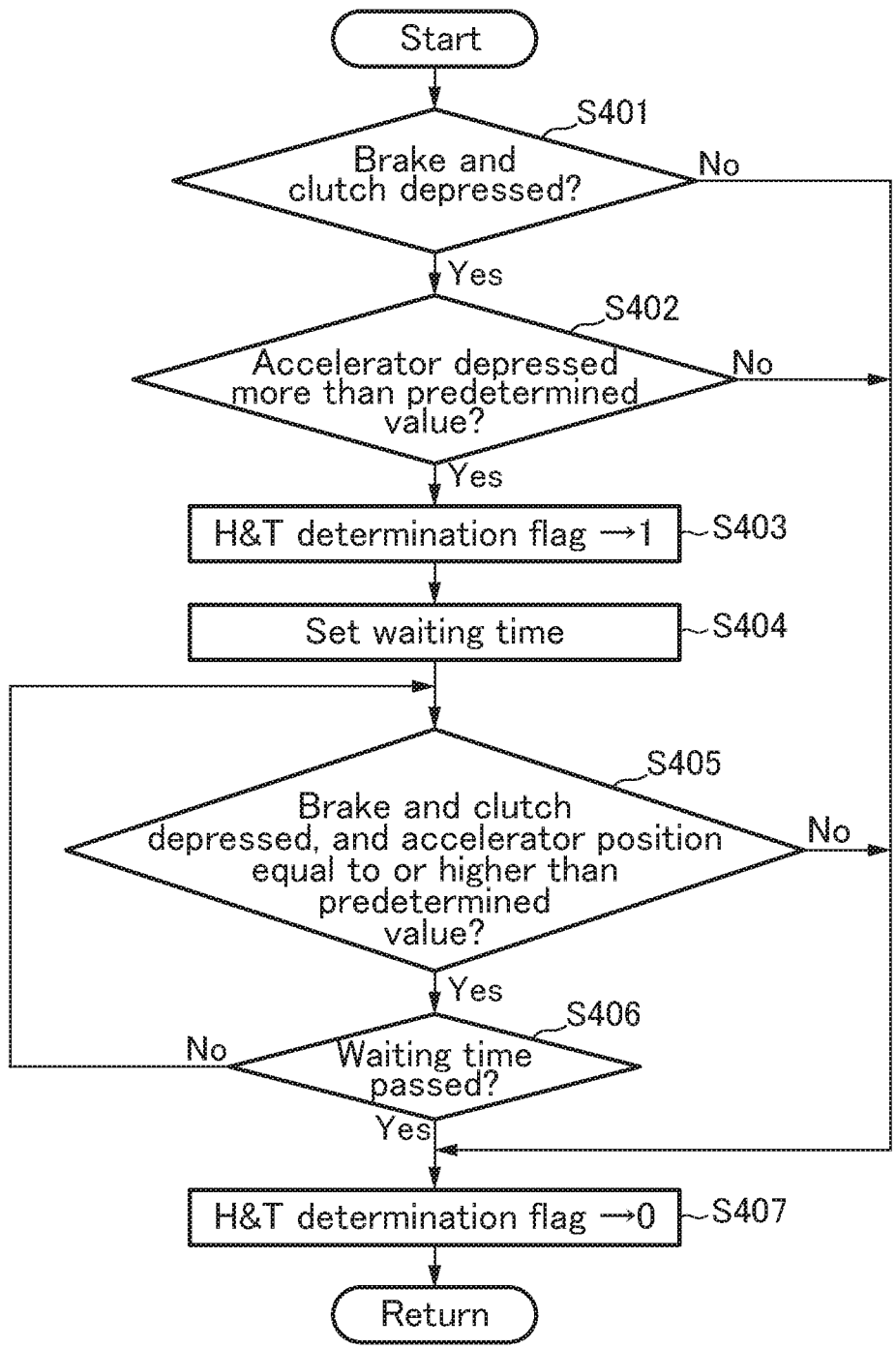
FIG. 11 is a flowchart depicting a H&T determination flag setting process performed when a BOS control is not executed in one embodiment of the present invention.

Next, with reference to FIGS. 11 and 12, the above described H&T determination flag setting process will be described. FIG. 11 is a flowchart depicting the H&T determination flag setting process performed when the BOS control is not executed in accordance with one embodiment of the present invention, and FIG. 12 is a flowchart depicting the H&T determination flag setting process performed when the BOS control is executed in accordance with one embodiment of the present invention. Such H&T determination flag setting process is executed in parallel with the engine control process shown in FIG. 5 and the BOS control execution flag setting process shown in FIG. 8. In addition, basically, such H&T determination flag setting process is executed from a state where the H&T determination flag is "0".

As shown in FIG. 11, in a case where the BOS control is not executed (in other words, under a normal state), when the H&T determination flag setting process is started, in step S401, the PCM 50 functions to determine as to whether both the brake pedal 102 and the clutch pedal 106 are depressed or actuated based on the detection signals from respective ones of the brake switch 66 and the clutch switch 68. As a result, if it is determined that both the brake pedal 102 and the clutch pedal 106 are depressed or actuated (step S401: Yes), the process proceeds to step S402. On the other hand, if it is not determined that both the brake pedal 102 and the clutch pedal 106 are depressed or actuated (step S401: No), in other words, in a case where one or both the brake pedal 102 and the clutch pedal 106 is/are not depressed or actuated, the process proceeds to step S407, and the PCM 50 functions to determine that the heel-and-toe operation is not performed, and set the H&T determination flag to "0".

In the step S402, the PCM 50 functions to determine based on the detection signal from the accelerator position sensor 64 as to whether the accelerator position is depressed or actuated from an approximately fully closed or unactuated state to an amount which is more than a predetermined value. As a result, if it is determined that the accelerator position is depressed or actuated more than the predetermined value (the step S402: Yes), the step proceeds to step S403, and the PCM 50 functions to determine that the heel-and-toe operation is being performed, and set the H&T determination flag to "1". On the other hand, if it is not determined that the accelerator position is depressed or actuated more than the predetermined value (the step S402: No), the process proceed to the step S407, and the PCM 50 functions to determine that the heel-and-toe operation is not being performed, and set the H&T determination flag to "0". Further, the predetermined value applied for determining the accelerator position in the step S402 is set in accordance with the accelerator position when the accelerator pedal is depressed or actuated in a case where the driver normally performs the heel-and-toe operation.

In the step S404, the PCM 50 functions to set the waiting time before switching the H&T determination flag from "1" to "0". Specifically, the PCM 50 functions to set the waiting time corresponding to the time necessary for the heel-and-toe operation to be performed by a general driver. In one example, the PCM 50 functions to set a fixed time (1 second, for example) as the waiting time. In another example, the PCM 50 functions to set a time corresponding to the atmospheric pressure as the waiting time. In this example, the PCM 50 functions to make the waiting time longer for lower atmospheric pressure. It is because, when the atmospheric pressure gets low, the response of the engine 10 becomes slower and the driver tends to execute the heel-and-toe operation for a relatively long time. Once the waiting time is set as described above in the step S404, the PCM 50 then functions to start countdown the set waiting time.

Subsequently, in step S405, the PCM 50 functions to determine as to whether both the brake pedal 102 and the clutch pedal 106 are depressed or actuated, and the accelerator position is of a value equal to or higher than the predetermined value, based on the detection signals from respective ones of the brake switch 66, the accelerator position sensor 64 and the clutch switch 68 during counting down the waiting time set in the step S404. In other words, the PCM 50 functions to determine as to whether the heel-and-toe operation is being continuously performed. Thus, the predetermined value applied for determining the accelerator position is set, for example, corresponding to the accelerator position under which the heel-and-toe operation by the driver surely ends, and in principle, a value larger than the predetermined value of the accelerator position used for determining the end of the BOS control at the step S313 of FIG. 8 is applied. As a result of the determination in the step S405, if it is determined that both the brake pedal 102 and the clutch pedal 106 are depressed or actuated, and the accelerator position is of a value equal to or higher than the predetermined value (the step S405: Yes), the process proceed to step S406. On the other hand, if it is not determined that both the brake pedal 102 and the clutch pedal 106 are depressed or actuated, and the accelerator position is of a value equal to or higher than the predetermined value (the step S405: No), in other words, when at least either of the brake pedal 102 and the clutch pedal 106 is released, and/or the accelerator position is less than the predetermined value, the process proceeds to the step S407, and the PCM 50 functions to determine that the heel-and-toe operation has ended, and switch the H&T determination flag from "1" to "0".

In the step S406, the PCM 50 functions to determine as to whether the waiting time has passed or not. As a result, if it is determined that the waiting time has passed (the step S406: Yes), the process proceeds to the step S407, and the PCM 50 functions to switch the H&T determination flag from "1" to "0". On the other hand, if it is not determined that the waiting time has passed (the step S406: No), the process returns to the step S405. In such case, the PCM 50 functions to repeat the determination of the step S405 until the waiting time passes.

Next, as shown in FIG. 12, in a case where the BOS control is being executed, when the H&T determination flag setting process is started, in step S501, the PCM 50 functions to determine based on the detection signals from respective ones of the brake switch 66 and the clutch switch 68 as to whether both the brake pedal 102 and the clutch pedal 106 are depressed or actuated. As a result, if it is determined that both the brake pedal 102 and the clutch pedal 106 are depressed or actuated (step S401: Yes), the process proceeds to step S502. On the other hand, if it is not determined that both the brake pedal 102 and the clutch pedal 106 are depressed (step S501: No), in other words, one or both the brake pedal 102 and the clutch pedal 106 is/are not depressed or actuated, the process proceeds to step S508, and the PCM 50 functions to determine that the heel-and-toe operation is not being performed, and set the H&T determination flag to "0".

In the step S502, the PCM 50 functions to determine as to whether the vehicle speed is of a value equal to or higher than the predetermined value and the accelerator position is of a value equal to or lower than the predetermined value, based on the detection signals from respective ones of the vehicle speed sensor 61 and the accelerator position sensor 64. In the step S502, the determination is made by using the accelerator position prior to the accelerator pedal 104 being depressed or actuated, and for the predetermined value for determining such accelerator position, use is made of an accelerator position which makes it possible to determine appropriately whether the driver's foot is in a state being stuck to the accelerator pedal 104.

As a result of the execution of the step S502, if it is determined that the vehicle speed is of a value equal to or higher than the predetermined value and the accelerator position is of a value equal to or lower than the predetermined value (the step S502: Yes), the process proceeds to step S503. On the other hand, if it is not determined that the vehicle speed is of a value equal to or higher than the predetermined value and the accelerator position is of a value equal to or lower than the predetermined value (the step S502: No), in other words, when the vehicle speed is less than the predetermined value and/or if the accelerator position is larger than the predetermined value, the process proceeds to step S508, and the H&T determination flag is set to "0". If the accelerator position is larger than the predetermined value, the situation may be interpreted that the driver's foot is in a state being stuck to the accelerator pedal 104, so that it is unlikely that the heel-and-toe operation is being performed, and the PCM 50 functions to set the H&T determination flag to "0".

In the step S503, the PCM 50 functions to determine as to whether the rate of change of the accelerator position is of a value equal to or higher than the predetermined value based on the detection signal from the accelerator position sensor 64. In other words, the PCM 50 functions to determine as to whether the accelerator position has changed to the depressed amount increasing side with a certain level of changing rate. In such case, the PCM 50 functions to use the accelerator position, for example, when the depression or actuation of the clutch pedal 106 is started, as an initial value to determine the rate of change of the accelerator position. The reason why the determination is made as such by using the rate of change of the accelerator position, but not the actual amount of actuation of the accelerator is to appropriately differentiate the change of the accelerator position under a state wherein the foot is in a state of being simply stuck to the accelerator pedal 104 from the change of the accelerator position under a state wherein the driver is intentionally performing the heel-and-toe operation. In view of the above, for the predetermined value to be applied for determining the rate of change of the accelerator position, it is possible to use a value which can differentiate the change of the accelerator position when the foot is in the state of being simply stuck to the accelerator pedal 104, from the change of the accelerator position when the driver is intentionally performing the heel-and-toe operation.

If the result of the step S503 indicates that the rate of change of the accelerator position is of a value equal to or higher than the predetermined value (step S503: Yes), the process proceeds to step S504. In such case, the accelerator position is changed to the depressed amount increasing side at a certain level of speed, so that it is interpreted that the driver has intentionally performed the accelerator actuation for the heel-and-toe operation. Thus, in the step S504, the PCM 50 functions to set the H&T determination flag to "1". On the other hand, if it is not determined that the rate of change of the accelerator position is of a value equal to or higher than the predetermined value (step S503: No), in other words, when the rate of change of the accelerator position is less than the predetermined value, the process proceeds to step S508. In such case, the accelerator position is being changed slowly (or the accelerator position is changed to the releasing side), so that it can be interpreted that the situation is in the state of the foot being stuck to the accelerator pedal 104, but not in the state where the accelerator actuation has been performed intentionally by the driver for heel-and-toe operation. Thus, in the step S508, the PCM 50 functions to set the H&T determination flag to "0".

In the step S505, the PCM 50 functions to set the waiting time prior to switching the H&T determination flag from "1" to "0". Specifically, the PCM 50 functions to set the waiting time corresponding to the time necessary for the heel-and-toe operation to be performed by a general driver. In one example, the PCM 50 functions to set a fixed time (1 second, for example) as the waiting time. In another example, the PCM 50 functions to set a time in accordance with the atmospheric pressure as the waiting time. In this example, the PCM 50 functions to make the waiting time longer for lower atmospheric pressure. The reason why is because, when the atmospheric pressure gets lower, the response of the engine 10 becomes slower and the driver tends to execute the heel-and-toe operation for a relatively long time.

Once the waiting time has been set as described above in the step S505, then the PCM 50 functions to start countdown the set waiting time.

Subsequently, in step S506, the PCM 50 functions to determine as to whether both the brake pedal 102 and the clutch pedal 106 are depressed or actuated, and the accelerator position is of a value equal to or higher than the predetermined value, based on the detection signals from respective ones of the brake switch 66, the accelerator position sensor 64 and the clutch pedal 68 during counting down the waiting time set in the step S505. In other words, the PCM 50 functions to determine as to whether the heel-and-toe operation is being continuously performed.

Here, in principle, a value larger than the predetermined value of the accelerator position used for determining the end of the BOS control at the step S313 of FIG. 8 is applied to the predetermined value used for determining the accelerator position in the step S506 (in other words, the determination value of the accelerator position used when the BOS control is being executed), as in the case of the predetermined value used for determining the accelerator position in the step S405 of FIG. 11 (in other words, the determination value of the accelerator position used when the BOS control is not being executed), and preferably, a value larger than the predetermined value used for determining the accelerator position in the step S405 of FIG. 11 may be applied. By doing so, in a case where the control corresponding to the heel-and-toe operation is executed when the BOS control is being executed, if the accelerator position decreases, such control corresponding to the heel-and-toe operation can be terminated to promptly return to the BOS control. Further, in the step S506, if the determination is made using the rate of change of the accelerator position as in the step S503, since the accelerator position changes relatively fast by the driver's intentional accelerator actuation, the H&T determination flag may be immediately switched from "1" to "0," and thus, in the step S506, the determination is made using the size of the accelerator position, not the rate of change of the accelerator position.

If the result of the step S506 indicates that both the brake pedal 102 and the clutch pedal 106 are depressed or actuated, and the accelerator position is of a value equal to or higher than the predetermined value (the step S506: Yes), the process proceeds to step S507. On the other hand, if it is not determined that both the brake pedal 102 and the clutch pedal 106 are depressed or actuated and that the accelerator position is of a value equal to or higher than the predetermined value (the step S506: No), in other words, when at least either of the brake pedal 102 and the clutch pedal 106 is released and/or the accelerator position is less than the predetermined value, the process proceeds to the step S508, and the PCM 50 functions to determine that the heel-and-toe operation has ended, and switch the H&T determination flag from "1" to "0".

In the step S507, the PCM 50 functions to determine as to whether the waiting time has passed. If the result of the step 507 indicates that the waiting time has passed (the step S507: Yes), the process proceeds to the step S508, and the PCM 50 functions to switch the H&T determination flag from "1" to "0". On the other hand, if it is not determined that the waiting time has passed (the step S507: No), the process returns to the step S506. In such case, the PCM 50 functions to repeat the step S506 until the waiting time passes.

<Example of Time Chart>

Subsequently, description will be made, with reference to FIG. 13, on an example of a time chart when a control according to one embodiment of the present invention is performed. FIG. 13 shows, from the top, the engine speed, ON/OFF state of the brake switch 66, ON/OFF state of the clutch switch 68, the accelerator position, the brake working fluid pressure, the H&T determination flag, and the BOS control execution flag. In addition, with respect to the accelerator position, the accelerator position detected by the accelerator position sensor 64 (the actual accelerator position) is shown by a solid line, and the controlled accelerator position to be applied in the BOS control is shown by a dashed line.

First, the brake switch 56 is switched from OFF to ON state, and also, the clutch switch 68 is switched from OFF to ON state, and further, the actual accelerator position becomes equal to or higher than the predetermined value (refer to arrows A11, A12 and A13) and thereby, at time t11, it is determined that the heel-and-toe operation is being performed, and the H&T determination flag is switched from "0" to "1" (refer to arrow A14). In such case, although both the brake pedal 102 and the accelerator pedal 104 are depressed or actuated simultaneously, since the H&T determination flag is set to "1," the BOS control execution flag is kept as "0" (refer to arrow A15). The reason for such control is because the heel-and-toe operation by the driver is given priority than limiting the engine output by the BOS control.

Subsequently, at time t12, by the actual accelerator position becoming equal to or lower than the predetermined value (refer to arrow A16), the PCM 50 determines that the heel-and-toe operation has ended, and the H&T determination flag is switched from "1" to "0" (refer to arrow A17). Then, with the clutch switch 68 being in the OFF state, the brake switch 66 is switched from OFF to ON resulting in an amplification in the brake working fluid pressure, and also the actual accelerator position is increased to a value equal to or higher than the predetermined value (refer to arrows A18 and A19), the brake pedal depressing force being then at a value equal to or higher than the determination threshold value due to the increase in the brake working fluid pressure, so that the BOS control execution flag is switched from "0" to "1" (refer to arrow A20) at the time t13 wherein the predetermined waiting time has passed. Under the situation, the BOS control is started, and the controlled accelerator position is decreased toward 0 in accordance with the predetermined accelerator position change gain to thereby decrease the engine output (refer to arrow A21). Then, when the brake switch 66 is switched to OFF, the controlled accelerator position is increased (refer to arrow A22), and when the brake switch 66 is switched to ON, the controlled accelerator position is decreased (refer to arrow A23).

Then, during the execution of the BOS control, with the brake switch 66 being ON and also the clutch switch 68 being ON (refer to arrow A24), when the rate of change of the actual accelerator position becomes a value equal to or higher than the predetermined value (refer to arrow A25), the H&T determination flag is switched at time t14 from "0" to "1" (refer to arrow A26). In such case, the H&T determination flag is switched to "1" during the BOS control execution, so that the BOS control execution flag is kept in the position "1" (refer to arrow A27). With the H&T determination flag set at the position "1" as described, the controlled accelerator position is increased or decreased under the predetermined accelerator position change gain, in accordance with the actual accelerator position which corresponds to the accelerator actuation provided by the driver, for the viewpoint of giving priority to the driver's intention of performing the heel-and-toe operation than limiting the engine output by the BOS control (refer to arrows A28 and A29). In addition, at time t15, with the actual accelerator position being at a value less than the predetermined value, the H&T determination flag is switched from "1" to "0" (refer to arrow A30).

Thereafter, as long as the BOS control execution flag is set to "1," even if the actual accelerator position is changed, the controlled accelerator position is not changed in accordance with the actual accelerator position unless the H&T determination flag is set to "1" (refer to arrow A31), and at time t16, with the actual accelerator position becoming a value equal to or lower than the predetermined value (refer to arrow A32), the BOS control execution flag is switched from "1" to "0" (refer to arrow A33). At this point, the BOS control is terminated.

<Operational Effects>

Next, functional and meritorious effects of the engine control device according to embodiments of the present invention will be described.

According to the present embodiments, in a case where both the accelerator pedal 104 and the brake pedal 102 are depressed or actuated simultaneously, the necessity of executing the BOS control is determined based not only on the brake working fluid pressure, but also on both the master vac negative pressure and the brake working fluid pressure in the brake system 200. With this operation, it is possible to determine the necessity of executing the control for decreasing the engine output based on the driver's application of brake corresponding to the characteristics of the master vac negative pressure and the brake working fluid pressure. Thus, it is possible to appropriately determine the necessity of executing the BOS control, taking into account the driver's intention of applying a braking effort. More particularly, in the present embodiments, since the brake pedal depressing force is determined based on the master vac negative pressure and the brake working fluid pressure, and the necessity of executing the BOS control is determined based on such brake pedal depressing force, it is possible to take into account the driver's intention of applying a braking effort more effectively.

In addition, according to the present embodiments, it is possible to accurately determine the brake pedal depressing force in accordance with the master vac negative pressure and the brake working fluid pressure since, under the same brake working fluid pressure, the brake pedal depressing force which shows a larger value is adopted as the master vac negative pressure becomes smaller. In such case, if a specific characteristic (such as a map) showing the relationship between the master vac negative pressure, the brake working fluid pressure and the brake pedal depressing force is prepared in advance, it is possible to easily determine the brake pedal depressing force corresponding to the current master vac negative pressure and the brake working fluid pressure by referring to such characteristic.

In addition, according to the present embodiments, when the master vac negative pressure is of a value equal to or lower than the predetermined value, in other words, when the pressure of the master vac is of a high value, a fixed value is applied as the brake pedal depressing force so that it is possible as well in this case to appropriately determine the necessity of executing the BOS control.

In addition, according to the present embodiments, since the engine torque is controlled based on the accelerator position, it is possible to accomplish a high controllability of the engine torque. More particularly, in the present embodiments, when the BOS control is executed, since the target torque is decreased to thereby decrease the engine output by decreasing the controlled accelerator position applied for setting the target torque, it is possible to improve controllability of the BOS control.

<Modifications>

In the above embodiment, the master vac negative pressure is detected by the negative pressure sensor 142, but the present invention is not limited to such a manner of detecting the master vac negative pressure. In another example, the master vac negative pressure may be estimated based on the atmospheric pressure detected by the atmospheric pressure sensor 62. In such case, an estimated master vac negative pressure may be provided by a value which is produced by subtracting a predetermined value of pressure from the atmospheric pressure (particularly, a negative value may be provided by the subtraction). Such predetermined pressure can be determined through experiments and/or simulations in advance. Such configuration for estimating the master vac negative pressure may be applied to a brake system which does not have the negative pressure sensor 142 and/or at an abnormal condition (at downtime, for example) of the negative pressure sensor 142.

In addition, in the embodiment described above, the master vac negative pressure is detected by the negative sensor 142, but it is possible to provide a pressure sensor for detecting the master vac negative pressure to calculate the master vac negative pressure based on the pressure detected by the pressure sensor and the atmospheric pressure detected by the atmospheric pressure sensor 62.

In the embodiment described above, although there is shown a configuration in which the present invention is applied to a manual transmission vehicle (a MT vehicle) comprising a manual type transmission 108, the present invention may also be applied to an automatic transmission vehicle (an AT vehicle) comprising an automatic transmission.

In the embodiment described above, although there is shown a configuration in which the present invention is applied to an engine 10 that is constructed as a gasoline engine, but the application of the present invention is not limited thereto, and it may also be applied to a diesel engine.

What is claimed is:

1. An engine control device configured to control an engine based on operation of an accelerator pedal and a brake pedal, comprising:
    a master vac negative pressure acquiring unit configured to acquire a master vac negative pressure in a master vac, wherein the master vac includes a stabilized chamber having an internal pressure kept negative, and a variable pressure chamber having an internal pressure which changes in accordance with an actuation of the brake pedal, wherein the master vac amplifies a brake pedal depressing force applied to the brake pedal in accordance with a difference between the internal pressure of the stabilized chamber and the internal pressure of the variable pressure chamber, and wherein the master vac negative pressure is a negative pressure of the stabilized chamber of the master vac;
    a brake working fluid pressure acquiring unit configured to acquire a brake working fluid pressure as a braking hydraulic pressure generated by a master cylinder in accordance with the brake pedal depressing force amplified by the master vac;
    a necessity determining unit configured to determine whether or not it is necessary to decrease engine output based on the master vac negative pressure acquired by the master vac negative pressure acquiring unit and the brake working fluid pressure acquired by the brake working fluid pressure acquiring unit, when both the accelerator pedal and the brake pedal are depressed simultaneously; and
    an engine controlling unit configured to perform an output decreasing control to decrease the engine output when the necessity determining unit determines that it is necessary to decrease the engine output.

2. The engine control device according to claim 1, wherein the necessity determining unit is configured to determine the brake pedal depressing force based on the master vac negative pressure and the brake working fluid pressure, and to determine that it is necessary to decrease the engine output when the determined brake pedal depressing force is equal to or larger than a predetermined threshold value.

3. The engine control device according to claim 2, wherein the necessity determining unit is configured to determine the brake pedal depressing force having a larger value as the master vac negative pressure becomes smaller under the same brake working fluid pressure.

4. The engine control device according to claim 2, wherein the necessity determining unit is configured, when the master vac negative pressure is equal to or smaller than a predetermined value, to use a fixed value as the brake pedal depressing force to determine whether or not it is necessary to decrease the engine output.

5. The engine control device according to claim 2, wherein the necessity determining unit is configured to determine the brake pedal depressing force corresponding to the master vac negative pressure acquired by the master vac negative pressure acquiring unit and the brake working fluid pressure acquired by the brake working fluid pressure acquiring unit, based on a predetermined characteristic showing a relationship between the master vac negative pressure, the brake working fluid pressure and the brake pedal depressing force.

6. The engine control device according to claim 1, wherein the master vac negative pressure acquiring unit is configured to acquire the master vac negative pressure by a pressure sensor provided on the master vac.

7. The engine control device according to claim 1, wherein the master vac negative pressure acquiring unit is configured to acquire a negative pressure which is estimated based on an atmospheric pressure, as the master vac negative pressure.

8. The engine control device according to claim 1, wherein the engine controlling unit is configured to:
    set a target torque based on an accelerator position being a position of the accelerator pedal to control an engine torque so that the target torque is realized; and
    decrease the target torque to decrease the engine output by decreasing the accelerator position applied for setting the target torque, when the output decreasing control is executed.

9. A brake pedal depressing force estimation method for estimating a brake pedal depressing force applied to a brake pedal, comprising steps of:
    acquiring a master vac negative pressure of a master vac, wherein the master vac includes a stabilized chamber having an internal pressure kept negative, and a variable pressure chamber having an internal pressure which changes in accordance with an actuation of the brake pedal, wherein the master vac amplifies a brake pedal depressing force in accordance with a difference between the internal pressure of the stabilized chamber and the internal pressure of the variable pressure chamber, and wherein the master vac negative pressure is a negative pressure of the stabilized chamber of the master vac;

acquiring a brake working fluid pressure as a braking hydraulic pressure generated by a master cylinder in accordance with the brake pedal depressing force amplified by the master vac; and determining the brake pedal depressing force based on the acquired master vac negative pressure and brake working fluid pressure, wherein the brake pedal depressing force is determined to be a larger value as the master vac negative pressure becomes smaller under the same brake working fluid pressure.

\* \* \* \* \*